US009419510B2

(12) United States Patent
Liu

(10) Patent No.: US 9,419,510 B2
(45) Date of Patent: Aug. 16, 2016

(54) RIPPLE CANCELLATION CONVERTER WITH HIGH POWER FACTOR

(71) Applicant: Queen's University at Kingston, Kingston (CA)

(72) Inventor: Yan-Fei Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 162 days.

(21) Appl. No.: 14/352,079

(22) PCT Filed: Oct. 17, 2012

(86) PCT No.: PCT/CA2012/000971
§ 371 (c)(1),
(2) Date: Apr. 16, 2014

(87) PCT Pub. No.: WO2013/056356
PCT Pub. Date: Apr. 25, 2013

(65) Prior Publication Data
US 2014/0252973 A1  Sep. 11, 2014

Related U.S. Application Data

(60) Provisional application No. 61/547,926, filed on Oct. 17, 2011.

(51) Int. Cl.
H02M 1/14 (2006.01)
H02M 1/15 (2006.01)
(Continued)

(52) U.S. Cl.
CPC ............... *H02M 1/143* (2013.01); *H02J 1/02* (2013.01); *H02M 1/15* (2013.01); *H02M 1/4258* (2013.01); *H05B 33/0815* (2013.01); *H05B 33/0851* (2013.01); *Y02B 70/126* (2013.01)

(58) Field of Classification Search
CPC ................................ H02M 1/143; H02M 1/15

USPC .......... 315/200; 323/259, 266, 281, 282, 284, 323/285, 275; 363/15–17, 20, 21.04, 21.01, 363/21.12, 21.14, 21.18, 41, 46, 67, 69, 71, 363/95, 97, 98, 84, 89, 131–133
See application file for complete search history.

(56) References Cited

U.S. PATENT DOCUMENTS 5,471,378 A * 11/1995 King .............................. 363/46
5,668,464 A * 9/1997 Krein et al. ................... 323/259
(Continued)

FOREIGN PATENT DOCUMENTS

JP  2000-125547 A  4/2000
WO  WO 2012/059778 A1  5/2012

OTHER PUBLICATIONS

Chen, C.-C., et al., "Fast Transition Current-Type Burst-Mode Dimming Control for the LED Back-Light Driving System of LCD TV", Power Electronics Specialists Conference, 2006, PESC '06, 37th IEEE.
(Continued)

*Primary Examiner* — Adolf Berhane
*Assistant Examiner* — Nusrat Quddus
(74) *Attorney, Agent, or Firm* — Stephen J. Scribner

(57) ABSTRACT

Provided are circuits and methods for use with a power supply that provides a main output including a main DC voltage having a first AC voltage ripple, or a main DC current having a first AC current ripple. A ripple cancellation converter provides a second AC voltage ripple connected in series with the main output, such that the first AC voltage ripple is substantially cancelled; or a second AC current ripple connected in parallel with the main output, such that the first AC current ripple is substantially cancelled. As a result, substantially ripple-free DC output power is provided.

21 Claims, 17 Drawing Sheets

(51) Int. Cl.
  *H02J 1/02* (2006.01)
  *H02M 1/42* (2007.01)
  *H05B 33/08* (2006.01)

(56) References Cited

U.S. PATENT DOCUMENTS

| | | | | |
|---|---|---|---|---|
| 5,668,708 | A | 9/1997 | Scapellati | |
| 6,026,126 | A * | 2/2000 | Gaetano | 375/296 |
| 6,097,614 | A * | 8/2000 | Jain et al. | 363/16 |
| 6,344,986 | B1 * | 2/2002 | Jain et al. | 363/89 |
| 6,577,512 | B2 | 6/2003 | Tripathi et al. | |
| 6,980,783 | B2 * | 12/2005 | Liu et al. | 455/296 |
| 7,079,403 | B2 * | 7/2006 | Liu et al. | 363/16 |
| 7,110,265 | B2 * | 9/2006 | Liu et al. | 363/16 |
| 8,054,058 | B2 * | 11/2011 | Liu et al. | 323/284 |
| 8,085,083 | B2 * | 12/2011 | Zhang et al. | 327/427 |
| 8,169,201 | B2 * | 5/2012 | Chung et al. | 323/268 |
| 9,122,287 | B2 * | 9/2015 | Mao et al. | |
| 2007/0267984 | A1 | 11/2007 | Peng | |
| 2008/0101099 | A1 * | 5/2008 | Jacobs | 363/47 |
| 2008/0278092 | A1 | 11/2008 | Lys et al. | |
| 2010/0270930 | A1 | 10/2010 | Hui | |
| 2011/0031899 | A1 | 2/2011 | Chu et al. | |
| 2012/0281444 | A1 * | 11/2012 | Dent | 363/56.01 |
| 2012/0313701 | A1 * | 12/2012 | Khlat et al. | 330/127 |
| 2014/0347896 | A1 * | 11/2014 | Chung et al. | 363/34 |
| 2015/0084527 | A1 * | 3/2015 | Siu et al. | 315/186 |

OTHER PUBLICATIONS

Chen, W. et al., "A Dimmable Light-Emitting Diode (LED) Driver With Mag-Amp Postreguletors for Muitistring Applicatioins", IEEE Transactions on Power Electronics, vol. 26, No. 6, 2011, pp. 1714-1722.

Singh, B. et al., "A Review of Active Filters for Power Quality Improvement", IEEE Transactions on Industrial Electronics, vol. 46, No. 5, Oct. 1999, pp. 960-971.

Qu, X. et al., "Noncascading Structure for Electronic Ballast Design for Multiple LED Lamps With Independent Brightness Control", IEEE Transactions on Power Electronics, vol. 25, No. 2, Feb. 2010, pp. 331-340.

International Search Report for International Application No. PCT/CA2012/000971 dated Jan. 30, 2013.

Written Opinion for International Application No. PCT/CA2012/000971 Dated Jan. 30, 2013.

Dixon, L., "Average Current Mode Control of Switching Power Supplies", Unitrode Corporation Application Note, 3-356-3-369, (1999).

Mammano, B., "Magnetic Amplifier Control for Simple, Low-Cost, Secondary Regulation", Unitrode Corporation, Topic 7, 7-1-7-9, (2001).

Wilkins, A. et al., "LED Lighting Flicker and Potential Health Concerns: IEE Standard PAR1789 Update", IEEE pp. 171-178, (2010).

Chinese Office Action dated Nov. 30, 2015 for corresponding Chinese Patent Application No. 201280061347.6 and Search Report.

* cited by examiner

RIPPLE CANCELLATION CONVERTER WITH HIGH POWER FACTOR

RELATED APPLICATIONS

This application is a 371 of International Application No. PCT/CA2012/000971, filed Oct. 17, 2012, which claims the benefit of the filing date of U.S. Application No. 61/547,926, filed Oct. 17, 2011, the contents of all of which are incorporated herein by reference in their entirety.

FIELD

This invention relates to methods and circuits for improving the performance of an AC to DC power supply. In particular, methods and circuits are provided for power supplies that achieve high power factor (PF) at the AC side and at the same time, reduce or substantially eliminate ripple in the DC output power. The methods and circuits may be used in any application where high power factor and/or low output ripple are required. In particular, the methods and circuits may be used in DC lighting applications, such as in light emitting diode (LED) lighting, wherein suppression of low frequency ripple in the output power eliminates visible flickering.

BACKGROUND

Regulation concerning power factor correction for a wide range of devices is becoming increasingly stringent. For example, new regulation requires power factor correction for any light emitting diode (LED) power supply with output power higher than 5 W.

For low to medium power level (e.g., 5 W to 100 W), a flyback converter is often used. FIG. 1 shows a block diagram of such a system. By forcing the average input current to follow the input voltage, high power factor can be achieved. In order to reduce the cost, critical conduction mode is often used to achieve power factor correction. However, this results in a ripple in the output voltage at harmonics of the line frequency. The second harmonic (e.g., 120 Hz for North America or 100 Hz for China, Europe) is of particular concern for DC lighting applications, such as LED lighting, as it results in visible flickering wherein the human eye can see fluctuation of the light emitting from the LED.

In such a conventional design there is a compromise between power factor and small low frequency current ripple through the load. For example, in order to achieve a power factor higher than 90%, the peak to peak value of the load current ripple can be as high as 60% of the average DC value. For example, for an average load current of 0.5 A, the low frequency current ripple can be as high as 0.3 A (peak to peak). This raises several problems: Firstly, as mentioned above, for DC lighting (e.g., LED) applications, the ripple current causes visible flickering. Secondly, it is difficult to achieve variable output power. When the average load current is reduced, the ripple current does not decrease proportionally and therefore the ripple current will become more of a problem at reduced output power. In DC lighting applications, flickering will be worse at reduced brightness. Thirdly, the ripple current degrades the lifespan of many devices, such as LEDs.

To achieve high power factor and small low frequency current ripple, two-stage conversion may be used. FIG. 2 shows a circuit block diagram of a conventional converter used to drive an LED, where the first stage 20 is typically a boost converter that converts the AC voltage into a high voltage, e.g., 400 V, and also achieves power factor correction. The second stage 22 is a DC to DC converter that converts the 400 V into a lower voltage required by the load 100, e.g., 50 V or 125 V, provides electrical isolation, and regulates the load current. However, compared to the converter of FIG. 1, the converter of FIG. 2 suffers from the drawbacks of higher cost and larger size.

SUMMARY

Provided herein is a circuit for use with a power supply that provides a main output including a main DC voltage with a first AC voltage ripple or a main DC current with a first AC current ripple, the circuit comprising a ripple cancellation converter that: (i) provides a second AC voltage ripple and is connected in series with the main output, such that the first AC voltage ripple is substantially cancelled; or (ii) provides a second AC current ripple and is connected in parallel with the main output, such that the first AC current ripple is substantially cancelled; wherein substantially ripple-free DC output power is provided.

Also provided herein is a circuit that provides DC power, comprising: a portion that outputs a main DC voltage with a first AC voltage ripple or a main DC current with a first AC current ripple; and a ripple cancellation converter that: (i) provides a second AC voltage ripple and is connected in series with the main output, such that the first AC voltage ripple is substantially cancelled; or (ii) provides a second AC current ripple and is connected in parallel with the main output, such that the first AC current ripple is substantially cancelled; wherein substantially ripple-free DC output power is provided.

In some embodiments, the ripple cancellation converter provides an auxiliary output comprising: (i) an auxiliary DC voltage with the second AC voltage ripple, wherein the second AC voltage ripple is substantially equal in magnitude and substantially opposite in phase to the first AC voltage ripple; or (ii) an auxiliary DC current with the second AC current ripple, wherein the second AC current ripple is substantially equal in magnitude and substantially opposite in phase to the first AC current ripple; wherein the main output and the auxiliary output are combined such that: (i) a total DC voltage or a total DC current is provided; (ii) the second AC voltage ripple substantially cancels the first AC voltage ripple, or the second AC current ripple substantially cancels the first AC current ripple; (iii) the total DC voltage or the total DC current is substantially ripple-free. The ripple cancellation converter may comprise a buck converter, a boost converter, a buck-boost converter, or a full bridge converter.

In one embodiment, the circuit further comprises a sensor that senses the first AC voltage ripple or the first AC current ripple, and outputs a sensor signal to the ripple cancellation converter. In one embodiment, the circuit further comprises a power factor correction portion. Operation of the power factor correction portion may be based on a feedback signal derived from a load current.

In some embodiments, the substantially ripple-free DC output power is variable.

Embodiments may be used with an AC-DC power supply. In one embodiment, the portion that outputs a main DC voltage with a first AC voltage ripple or a main DC current with a first AC current ripple comprises an AC-DC power supply. The AC-DC power supply may comprise a flyback converter, an isolated boost converter, a buck-boost converter, a buck converter, or a boost converter.

In some embodiments, a load comprises an LED.

Also provided herein is a method for providing DC power from a main output power comprising a main DC voltage with a first AC voltage ripple or a main DC current with a first AC current ripple, the method comprising: (i) connecting a second AC voltage ripple in series with the main output power, such that the first AC voltage ripple is substantially cancelled; or (ii) connecting a second AC current ripple in parallel with the main output, such that the first AC current ripple is substantially cancelled; wherein substantially ripple-free DC output power is provided.

Also provided herein is a method for providing DC power, comprising: outputting a main output power comprising a main DC voltage with a first AC voltage ripple or a main DC current with a first AC current ripple; and (i) connecting a second AC voltage ripple in series with the main output power, such that the first AC voltage ripple is substantially cancelled; or (ii) connecting a second AC current ripple in parallel with the main output, such that the first AC current ripple is substantially cancelled; wherein substantially ripple-free DC output power is provided.

In some embodiments the method further comprises: (i) providing an auxiliary DC voltage with the second AC voltage ripple, wherein the second AC voltage ripple is substantially equal in magnitude and substantially opposite in phase to the first AC voltage ripple; or (ii) providing an auxiliary DC current with the second AC current ripple, wherein the second AC current ripple is substantially equal in magnitude and substantially opposite in phase to the first AC current ripple; wherein connecting includes combining the auxiliary DC voltage with the main DC voltage, or combining the main DC current with the auxiliary DC current, such that: (i) a total DC voltage or a total DC current is provided; (ii) the second AC voltage ripple substantially cancels the first AC voltage ripple, or the second AC current ripple substantially cancels the first AC current ripple; (iii) the total DC voltage or the total DC current is substantially ripple-free.

Embodiments may include using a buck converter, a boost converter, a buck-boost converter, or a full bridge converter to provide the second AC voltage ripple or to provide the second AC current ripple.

One embodiment further comprises sensing the first AC voltage ripple or the first AC current ripple, and outputting a sensor signal to the ripple cancellation converter.

Another embodiment further comprises adjusting a power factor of a circuit used to provide DC power. The method may comprise adjusting the power factor based on a feedback signal derived from a load current.

Embodiments may include varying the substantially ripple-free DC output power.

Embodiments may be used with an AC-DC power supply. Various embodiments include using a flyback converter, an isolated boost converter, a buck-boost converter, a buck converter, or a boost converter for the AC-DC power supply.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION

Provided herein are AC to DC power supply methods and circuits that provide substantially ripple-free output power and achieve high power factor. The methods and circuits provided herein may be used in any power supply application where substantially ripple-free output power and high power factor are desirable, such as, but not limited to, computers, tablets, cell phones, etc. Embodiments are described primarily with respect to lighting applications, e.g., wherein the load is an LED; however, it is to be understood that they are not limited thereto.

For the sake of brevity, the term "LED" as used herein is intended to refer to a single LED or to multiple LEDs electrically connected together (e.g., in a series, parallel, or series-parallel arrangement). It will be appreciated that an LED lighting fixture (e.g., an LED lamp) may include a single LED or multiple LEDs electrically connected together.

The methods and circuits achieve high power factor (PF) at the AC side and reduce or substantially eliminate ripple in the DC output power. The ripple may be a harmonic of the line frequency, such as the second harmonic (e.g., 120 Hz for North America or 100 Hz for China, Europe) of the line frequency. In DC lighting (e.g., LED) applications, ripple at the $2^{nd}$ harmonic results in visible flickering, wherein the human eye can see fluctuation of the light emitting from the LED. Therefore, of particular interest for lighting applications is suppression or elimination of ripple at the $2^{nd}$ harmonic. The methods and circuits described herein reduce or substantially eliminate ripple at the second harmonic and at other harmonics. The methods and circuits provided herein minimize component counts, providing power supplies that are compact and cost effective. Embodiments may be implemented in any currently-available semiconductor technology. Embodiments may be implemented as a hybrid circuit comprising one or more integrated circuit (IC) component together with discrete components, or substantially as an IC.

Provided herein are circuits and methods for use with a power supply that provides a main output including a main DC voltage having a first AC voltage ripple, or a main DC current having a first AC current ripple. The methods and circuits include a ripple cancellation converter (RCC). The ripple cancellation converter (i) provides a second AC voltage ripple connected in series with the main output, such that the first AC voltage ripple is substantially cancelled; or (ii) provides a second AC current ripple connected in parallel with the main output, such that the first AC current ripple is substantially cancelled. As a result, substantially ripple-free DC output power is provided.

Figure 2:
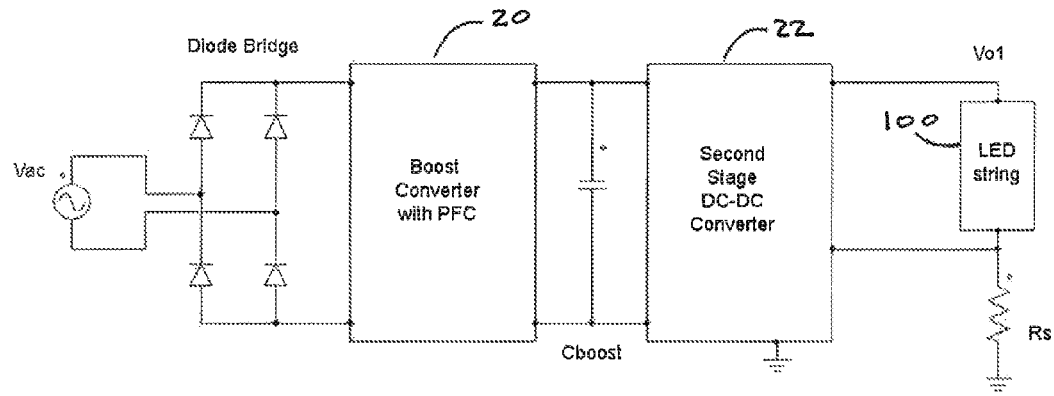
FIG. 2 is a block diagram of a two-stage LED driver according to the prior art.

In some embodiments, a first portion provides most of the DC power (i.e., the main output power) to the load with a small AC component (i.e., a selected amount of voltage ripple or current ripple), and a second portion provides a small amount of DC power (i.e., auxiliary power) to the load and an AC component that cancels the voltage ripple or current ripple produced by the first portion. The AC component provided by the second portion is substantially equal in magnitude and substantially opposite in phase (i.e., inverse) to the AC component provided by the first portion, such that combining the AC components of the first and second portions substantially cancels ripple in the total output power to the load. The total output power to the load therefore includes the main DC power provided by the first portion together with the auxiliary DC power provided by the second portion, substantially without ripple. The first portion may be implemented with fewer and/or smaller components, such as, for example, a smaller output capacitor, such that size and cost of the first portion is reduced, and efficiency is improved. Also, since the auxiliary power provided by the second portion is only a small amount of the total output power, it may be implemented using passive components with smaller inductance and capacitance values, and active components with lower voltage and/or current ratings, so as to achieve ripple cancellation and supply the required auxiliary output power with reduced cost and size relative to a conventional converter such as shown in FIG. 2. Power supply methods and circuits provided herein include series-connected embodiments for voltage ripple cancellation, wherein the output of a ripple cancellation converter is connected in series with a main output, and parallel-connected embodiments for current ripple cancellation, wherein the output of a ripple cancellation converter is connected in parallel with a main output.

Series Ripple Cancellation Converter

Figure 1:
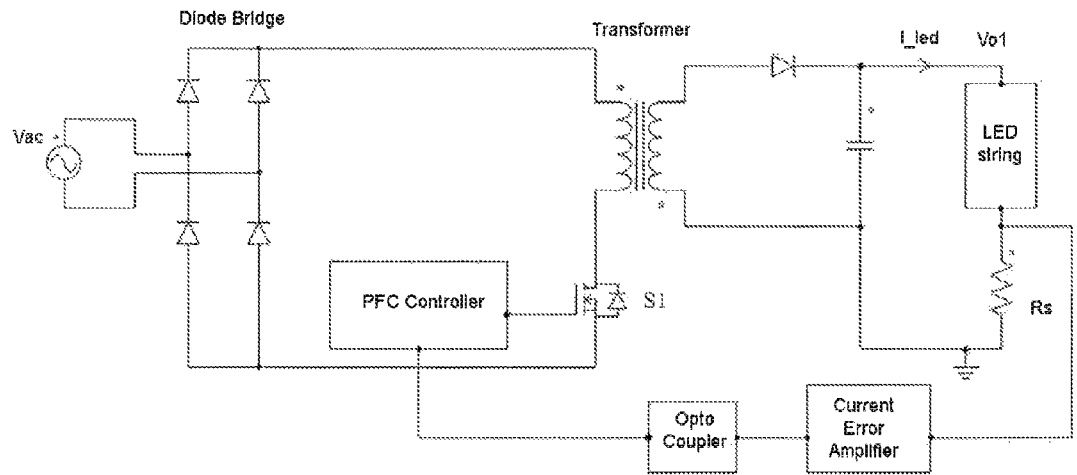
FIG. 1 is a block diagram of an LED driver with a flyback converter according to the prior art.
Figure 3:
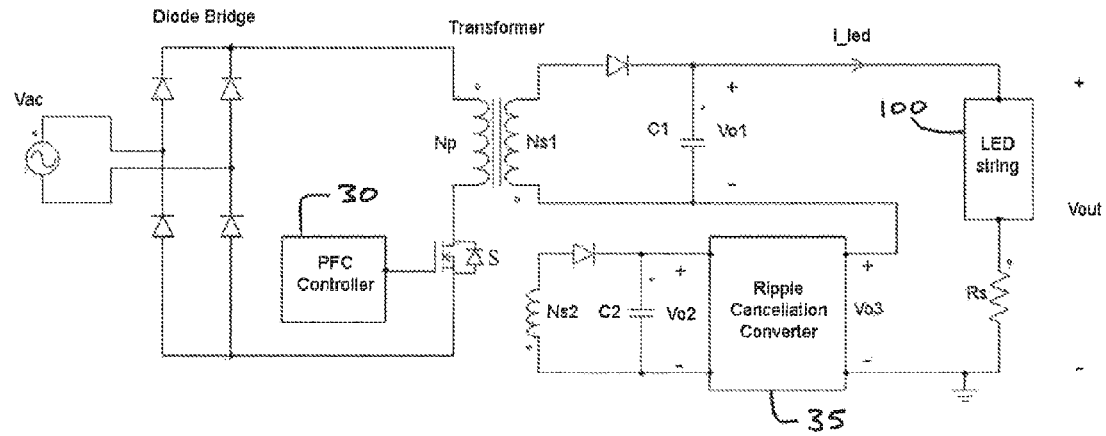
FIG. 3 is a block diagram of a power supply with a ripple cancellation controller according to one embodiment.

A series-connected embodiment based on a flyback converter will now be described with reference to FIG. 3. In the embodiment of FIG. 3, the primary side includes a full-wave bridge rectifier and a switch S in series with a transformer primary winding Np. A power factor correction (PFC) controller controls the switch S to achieve high power factor at the primary (input) side. Different from the conventional flyback architecture shown in FIG. 1, the secondary side includes first and second secondary windings Ns1 and Ns2, respectively. Winding Ns1 provides the main voltage Vo1. Winding Ns2 provides a secondary voltage Vo2. The voltage Vo2 is followed by a ripple cancellation converter 35 with auxiliary output voltage Vo3. The main voltage Vo1 and the auxiliary voltage Vo3 are connected in series to provide the total output voltage Vout for the load 100.

When power factor correction is achieved, or when the power factor is high, the output voltage Vo1 will contain a significant amount of low frequency voltage ripple at a frequency two times the line frequency (e.g., 120 Hz in North America), as shown in the following equation:

$$Vo1 = Vo1\_dc + Vo1\_rip \quad (1)$$

In the above equation, Vo1_dc represents the DC component of Vo1 and Vo1_rip represents the low frequency component of Vo1.

The output of the ripple cancellation converter may be expressed by the following equation:

$$Vo3 = Vo3\_dc + Vo3\_rip \quad (2)$$

In the above equation, Vo3_dc represents the DC component of Vo3, and Vo3_rip represents the low frequency component of Vo3.

Therefore, the total output voltage which will be applied to the load may be derived as:

$$Vout = Vo1 + Vo3 = Vo1\_dc + Vo3\_dc + Vo1\_rip + Vo3\_rip \quad (3)$$

The DC value (Vout_dc) and low frequency ripple value (Vout_rip) of the total output Vout may be expressed as:

$$Vout\_dc = Vo1\_dc + Vo3\_dc \quad (4)$$

$$Vout\_rip = Vo1\_rip + Vo3\_rip \quad (5)$$

The ripple cancellation converter is constructed and controlled such that the low frequency voltage ripple (Vo3_rip) is the same in magnitude and inverse in phase compared with the low frequency voltage ripple in Vo1, as shown in the following equation:

$$Vo3\_rip = -Vo1\_rip \quad (6)$$

Substituting (6) into (5), the following equation is obtained:

$$Vout\_rip = 0 \quad (7)$$

Therefore, the voltage across the load will contain substantially no low frequency ripple. In the case where the load is an LED, flickering of the LED is avoided and lifespan of the LED is not degraded.

Figure 4:
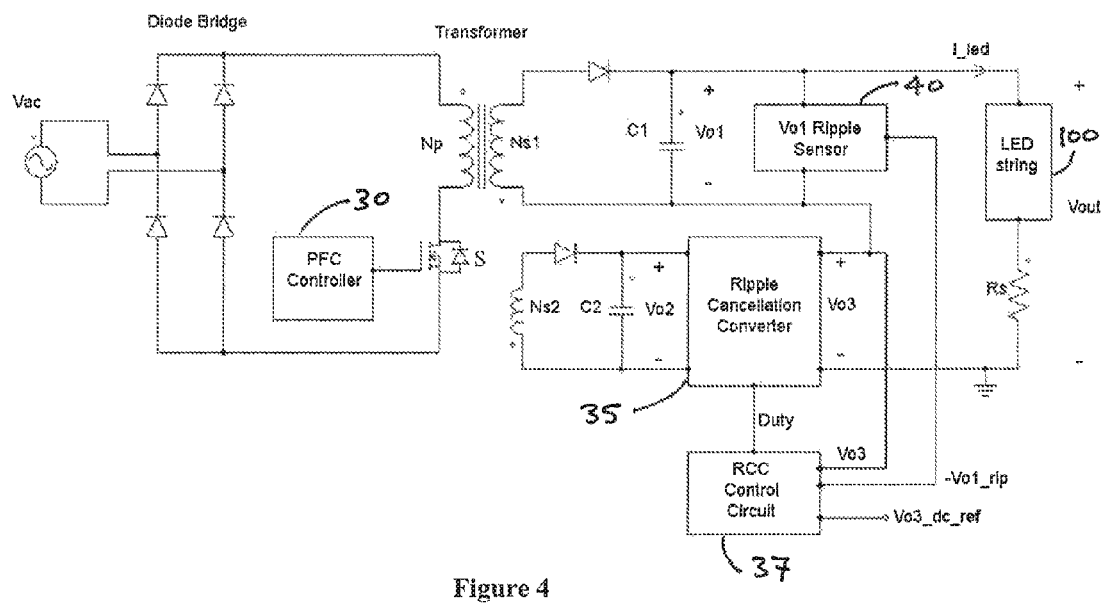
FIG. 4 is a block diagram of a power supply with a ripple cancellation controller and control architecture, according to one embodiment.

FIG. 4 shows a block diagram of a series embodiment with control blocks. In the figure, a Vo1 ripple sensor 40 senses the low frequency ripple component of Vo1 and provides an output of the ripple with inverse polarity to a RCC control circuit 37. The Vo1 ripple sensor may include, for example, a high pass filter. The Vo1 ripple sensor output is −Vo1_rip. Vo3_dc_ref is a reference voltage for the DC value of the RCC output voltage. The reference of the RCC is Vo3_ref=Vo3_dc_ref+(−Vo1_rip). Therefore, the control circuit 37 will regulate the output voltage Vo3 as:

$$Vo3 = Vo3\_dc\_ref + (-Vo1\_rip) = Vo3\_dc\_ref - Vo1\_rip \quad (8)$$

Therefore, the output voltage Vout may be expressed as:

$$Vout = Vo1\_dc + Vo1\_rip + Vo3\_dc\_ref - Vo1\_rip = Vo1\_dc + Vo3\_dc \quad (9)$$

In the above equation, Vo3_dc=Vo3_dc_ref. The value of Vo1_dc may be regulated by the PFC controller 30 to control the DC value of the load current. This is discussed in detail below.

Whereas it may be desirable to reduce the power consumption, and therefore size, of the ripple cancellation converter, the DC value of Vo3 (Vo3_dc) should be minimized. For example, the value of Vo3_dc_ref may be set to 0, in which case the output voltage of the ripple cancellation converter is only the ripple voltage of Vo1, Vo1_rip.

Figure 5:
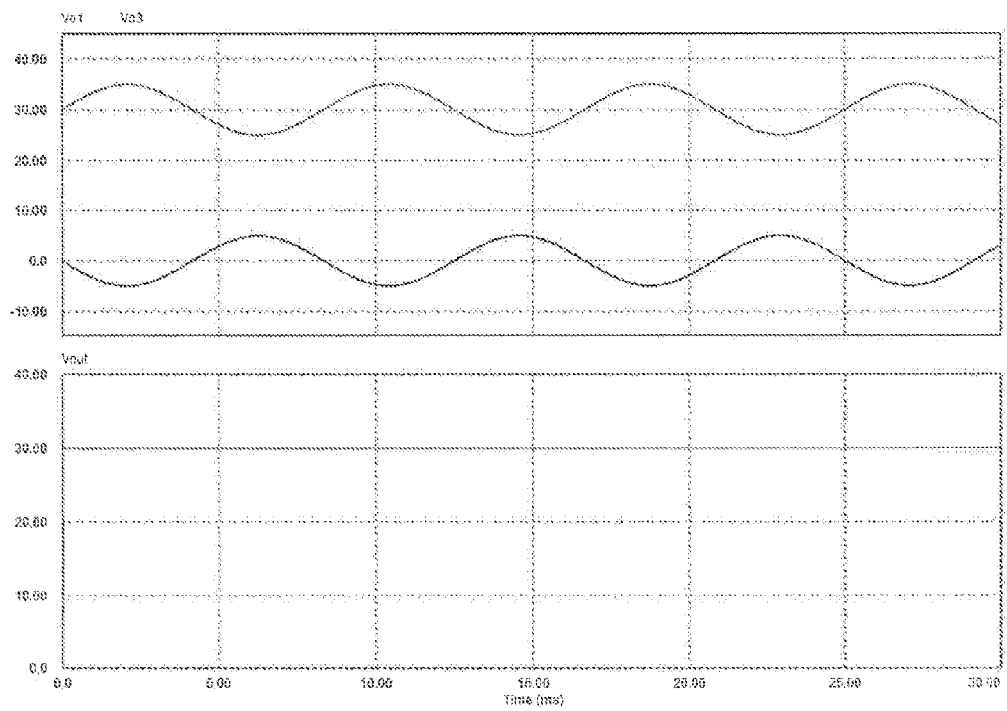
FIG. 5 is a plot showing voltage waveforms of the embodiment of FIG. 4.

FIG. 5 shows the waveforms of Vo1 (top), Vo3 (middle) and Vout (bottom) when only low frequency ripple is considered. It can be observed that the low frequency voltage ripple in Vo1 has been completely compensated by Vo3 and the output voltage (Vout) that will be applied to the load does not contain any low frequency ripple.

In other embodiments the DC value of Vo3 (Vo3_dc) is minimized, but is greater than zero so as to provide a DC offset that is high enough to prevent the instantaneous output voltage from going below 0 V. That is, the value of Vo3_dc_ref may be set to a value equal to or higher than the peak value of the ripple. For example, if the peak value of the ripple is 1.5 V, Vo3_dc_ref may be set to 2 V, in which case the output voltage of the ripple cancellation converter is the ripple voltage of Vo1, Vo1_rip with DC offset Vo3_dc. To minimize power dissipation in the RCC, Vo3_dc_ref may be set to a value equal to or slightly higher than the peak value of the ripple.

The series topology and control strategy embodiments described above remove or substantially reduce ripple, such as low frequency ripple (e.g., 100 Hz or 120 Hz), in the DC output power. In the power supply embodiments described herein, ripple cancellation and power factor correction are achieved at the same time by separate control loops. Ripple cancellation is achieved by the ripple cancellation converter 35 and its related control circuit 37. Power factor correction is achieved by the PFC controller 30 at the primary side.

Load Current Control

Figure 6:
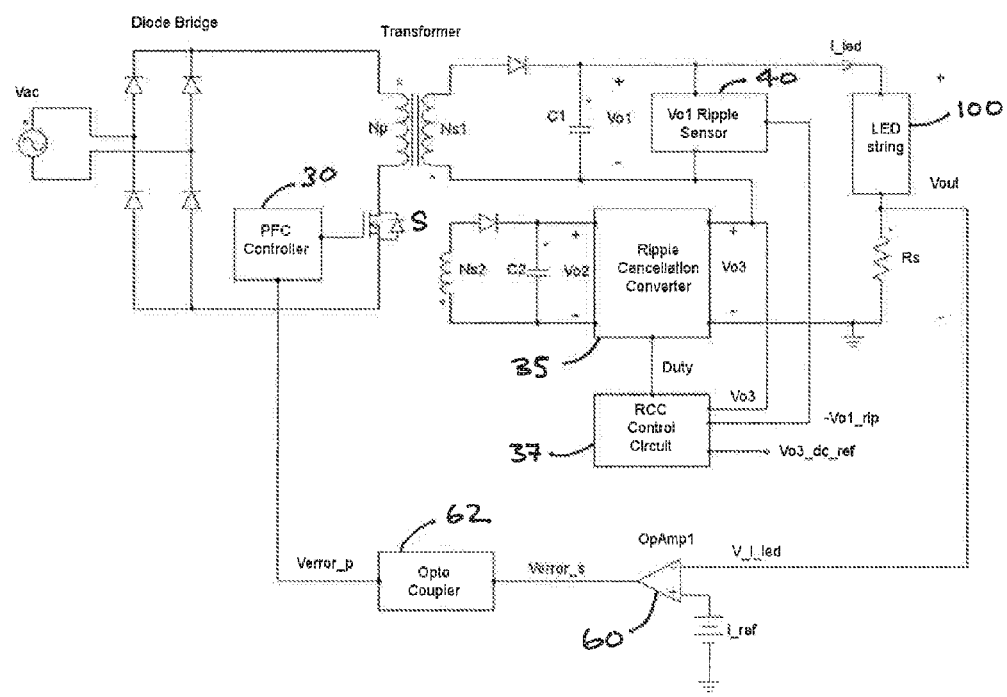
FIG. 6 is a block diagram of a power supply with a ripple cancellation controller and load current control according to one embodiment.

The load current may be controlled by regulating the DC value of Vo1. FIG. 6 shows the embodiment of FIG. 4 with current control added to achieve this objective. Operation of this embodiment will be described for the case where the load 100 is an LED. The LED current is sensed using a current sense resistor Rs. The sensed signal V_I_led is compared with a reference LED current I_ref by a current error amplifier 60, in this case OpAmp1. Its output is the error voltage Verror_s, which is transferred to the primary side using an isolating device 62 such as, for example, an opto-coupler. Verror_p is used to control the PFC controller on the primary side to adjust the voltage level of Vo1. By changing the current reference level I_ref, the LED current may be controlled by the PFC controller. The ripple voltage across Vo1 will be automatically compensated by the ripple cancellation converter 35. Therefore, power factor control and LED current control are de-coupled and high power factor can be achieved over wide LED current variation range.

Figure 7:
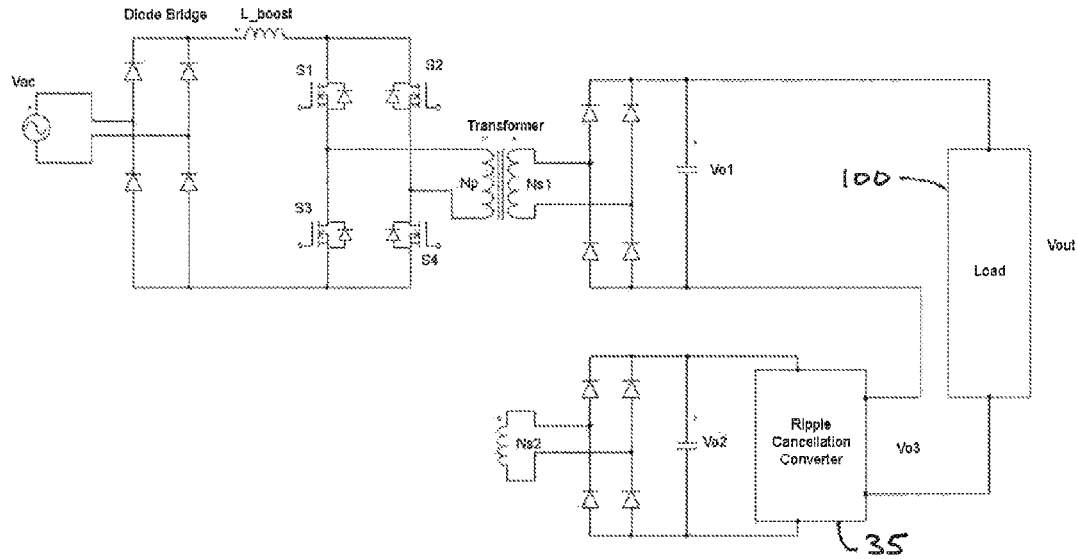
FIG. 7 is a block diagram of a power supply with a ripple cancellation controller based on an isolated boost converter, according to one embodiment.

In the above embodiments a flyback converter is used as an example of an implementation for power factor correction. It will be understood that other converters may also be used. For example, a boost converter with isolating transformer for power factor correction may also be used, as shown in FIG. 7.

Figure 8:
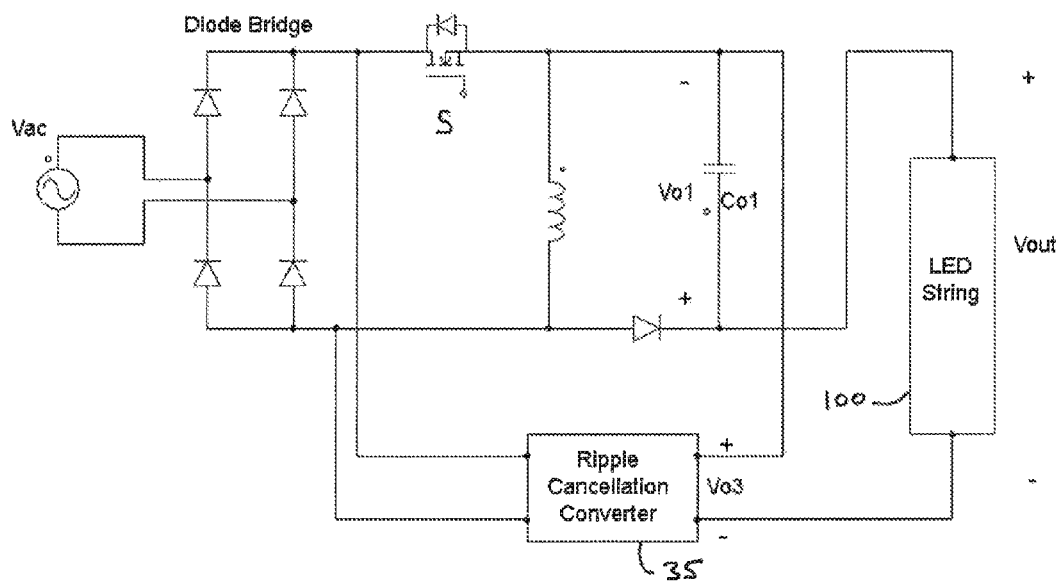
FIG. 8 is a diagram of power supply with a ripple cancellation controller based on a non-isolated buck-boost converter that generates output Vo1, according to one embodiment.

Further, the output Vo3 may also be generated using other converter designs. For example, in the embodiment shown in FIG. 8, the output Vo1 is generated with a non-isolated buck-boost converter. The ripple cancellation converter, which generates Vo3, may be implemented using a flyback converter. In this configuration, the voltage ripple in Vo1 may be compensated by Vo3 using the above-mentioned control method. The DC value of the load current is controlled by the DC value of Vo1 (Vo1_dc). Vo1_dc is controlled by the PFC controller of the buck-boost converter.

Ripple Cancellation Converter Implementation

Figure 9:
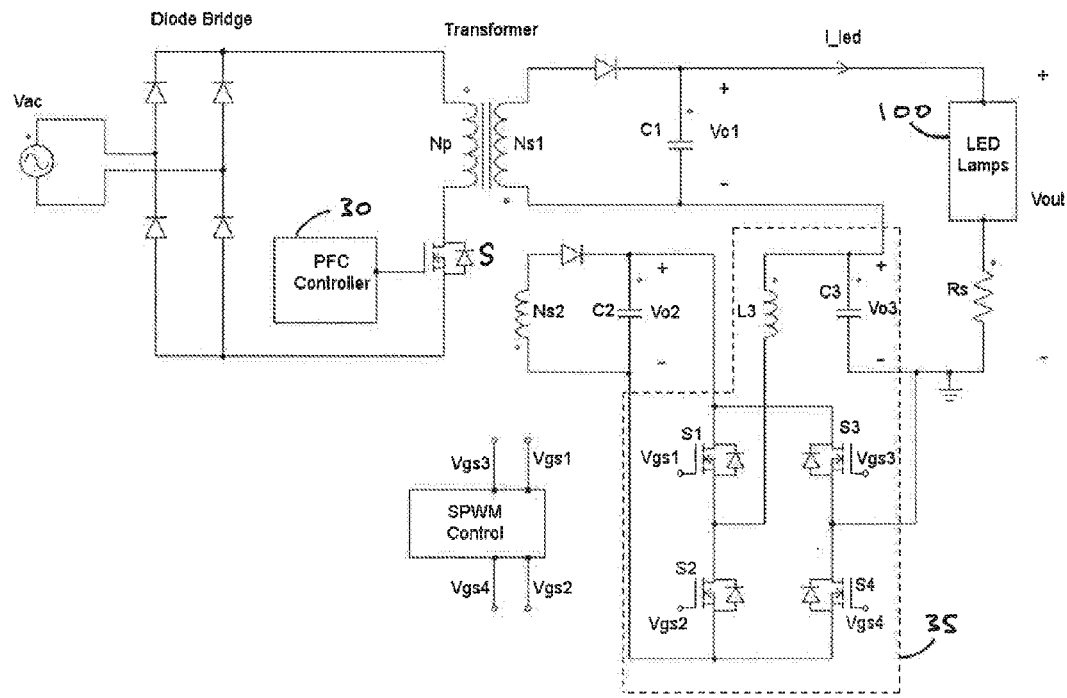
FIG. 9 is a schematic diagram of power supply with a ripple cancellation controller based on a full bridge converter and pulse width modulation control, according to one embodiment.

The ripple cancellation converter may be implemented with different types of switching converters. One example is a full bridge converter, as shown in FIG. 9. In this embodiment, the DC value of the full bridge converter may be zero, a positive value, or a negative value. Its low frequency ripple may be controlled to be the same as the low frequency ripple of Vo1 with inverse polarity. That is, the output of the full bridge converter may be regulated as:

$$Vo3 = Vo3\_dc - Vo1\_rip \quad (10)$$

Figure 10:
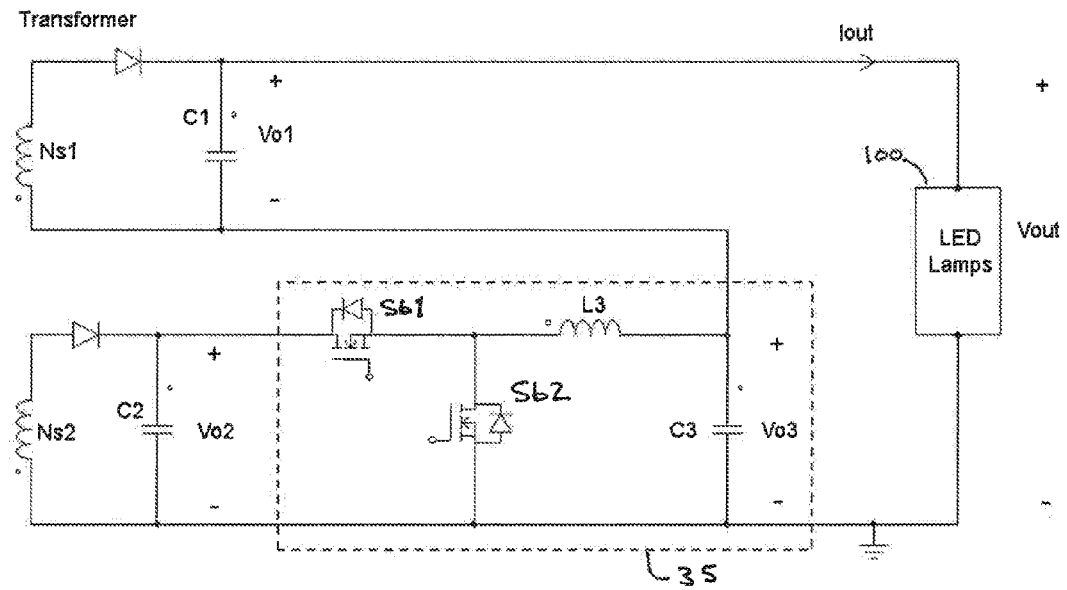
FIG. 10 is a schematic diagram of a ripple cancellation converter implemented with a buck converter, according to one embodiment.

For embodiments where a buck converter is used as the ripple cancellation converter, an example of a power circuit is shown in FIG. 10. In FIG. 10, only the secondary side circuit is shown (the primary side circuit is the same as in FIG. 9). Using a buck converter, the DC value of Vo3 cannot be reduced to zero. Similarly, −Vo1_rip is used as part of the reference voltage for the buck converter. The output voltage Vo3 is controlled as:

$$Vo3 = Vo3\_dc - Vo1\_rip \quad (11)$$

The maximum and minimum value of Vo3 may be calculated as:

$$Vo3\_max = Vo3\_dc + 0.5 * Vo1\_rip\_pp \quad (12)$$

$$Vo3\_min = Vo3\_dc - 0.5 * Vo1\_rip\_pp \quad (13)$$

In the above equations, Vo1_rip_pp represents the peak to peak value of the low frequency ripple for Vo1. It is advantageous to set the Vo3_dc to be a little bit higher than 0.5*Vo1_rip_pp. In this way, the power provided by the buck converter will be minimized and the overall efficiency will be improved.

In addition, in order for the buck converter to operate properly, the transformer secondary side turns ratio (Ns1 and Ns2), as well as the output capacitor values (C1 and C2) should be selected so that the following relations are satisfied:

$$Vo2\_min > Vo3\_dc + 0.5 * Vo1\_rip\_pp \quad (14)$$

$$Vo2\_min = Vo2\_dc - 0.5 * Vo2\_rip\_pp \quad (15)$$

In equation (15), Vo2_rip_pp represents the peak to peak value of the low frequency ripple for Vo2. That is, the minimum Vo2 value should be higher than the maximum value of Vo3.

Figure 11A:
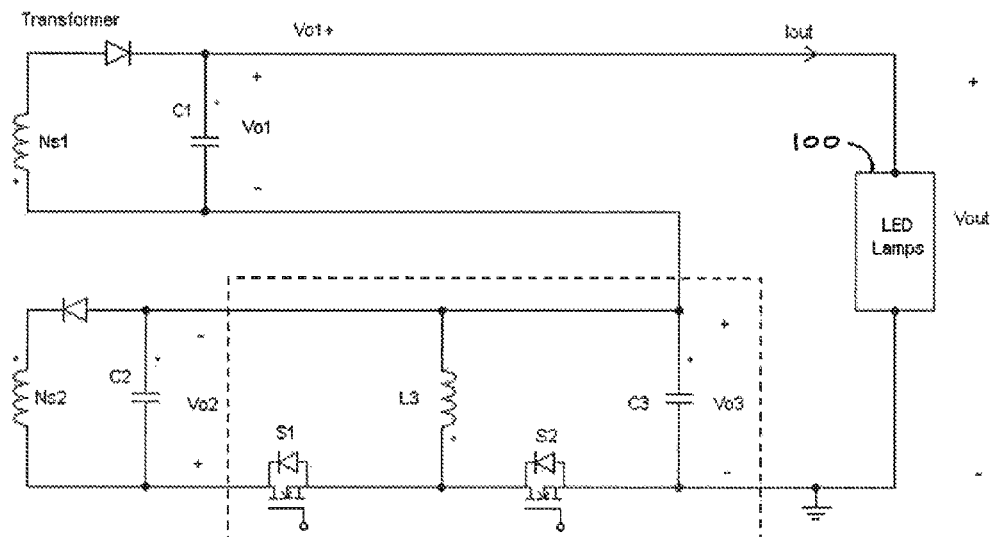
FIG. 11(a) is a schematic diagram of a ripple cancellation converter implemented with a buck-boost converter, according to one embodiment.

The power circuit for an embodiment where a buck-boost converter is used as the ripple cancellation converter is shown in FIG. 11(a). In FIG. 11(a), only the secondary side is shown (the primary side circuit is the same as in FIG. 9). Of note is the reference direction of the voltage Vo2.

As described above, −Vo1_rip is used as part of the reference voltage for the buck-boost converter. The output voltage Vo3 may be controlled as:

$$Vo3 = Vo3\_dc - Vo1\_rip \quad (16)$$

In order to achieve ripple cancellation, Ns1, Ns2 and C1, C2 should be selected properly to meet the following requirement:

$$Vo3\_dc > Vo3\_min + 0.5 * Vo1\_rip\_pp \quad (17)$$

That is, the minimum output voltage of Vo3 should be higher than zero. The ripple cancellation converter may also be implemented using other switching converters, such as, but not limited to, a boost converter, as would be apparent to one of ordinary skill in the art.

In practice, it is desirable to limit the DC value of Vo3 (Vo3_dc) to just slightly higher than half the ripple voltage, (0.5*Vo1_rip_pp). Therefore, a control strategy according to one embodiment is to sense the peak to peak value of the ripple voltage (Vo1_rip_pp) and then set the DC value of Vo3 as $$Vo3\_dc\_ref = 0.5 * Vo1\_rip\_pp + V\_offset \quad (17a)$$

In equation (17a), V_offset is a small DC value, such as, for example, 0.5V, 0.75V, 1.0V, etc. Alternatively, Vo3_dc_ref may be determined by the following equation:

$$Vo3\_dc\_ref = (0.5 + K\_offset) * Vo1\_rip\_pp \quad (17b)$$

In equation (17b), K_offset is a small positive value, such as, for example, 0.1 to 1. With this arrangement, the relation (17) will always be satisfied under different ripple conditions for Vo1.

As described above, an isolating device such as an opto-coupler may be used where the load current is regulated by a primary side PFC controller. In some applications where an opto-coupler cannot be used or where it is not preferred to use an opto-coupler, the load current may also be regulated using the DC value of Vo3.

As can be observed from equation (9), when Vo3_dc is changed, the voltage across the load will also change and, consequently, the load current will change. In this case, the voltage Vo1 will be controlled to be substantially constant through primary side voltage sensing by controlling a primary auxiliary voltage at the primary side as described below with reference to FIG. 11(b).

Figure 11B:
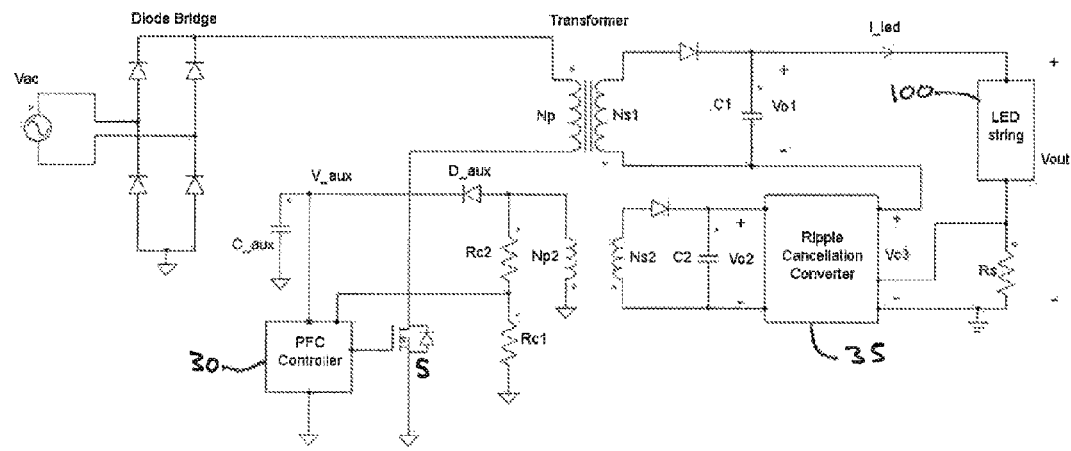
FIG. 11(b) is a diagram of a power supply with current control using a second primary winding for isolation, according to one embodiment.

In FIG. 11(b), a second primary winding Np2 is added at the primary side. Diode D_aux and capacitor C_aux are used to create an auxiliary voltage for the PFC controller. Because of the nature of a flyback converter, the relationship between V_aux and Vo1 can be expressed approximately as the following:

$$V\_aux = Vo1 * Np2 / Ns1 \quad (17c)$$

It can be observed that by maintaining V_aux at a predetermined level, Vo1 can also be controlled. Therefore, the output voltage Vout can be controlled by changing Vo3. At the secondary side, the voltage across the current sense resistor Rs is sent to the ripple cancellation converter, which changes the voltage Vo3 to regulate the load current.

In FIG. 11(b), Rc1 and Rc2 are used to detect the zero crossing of the magnetizing inductor current. Of course, other methods and circuits may be used to control operation of the PFC, as will be readily apparent to one of ordinary skill in the art.

Figure 12:
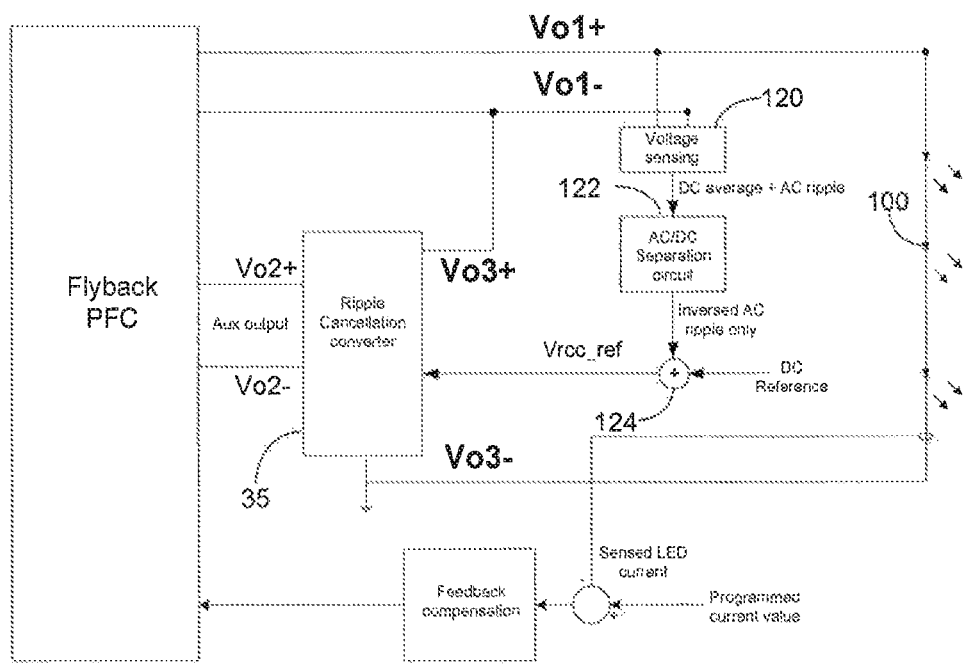
FIG. 12 is a block diagram of a power supply with current control and an external DC reference voltage, according to one embodiment.

The block diagram of FIG. 12 shows an embodiment with an LED load wherein an external DC reference voltage is used. In this embodiment, the ripple voltage of the main output voltage (between Vo1+ and Vo1−) is sensed at 120 and separated at 122 from its DC component, and added at summer 124 to the DC reference voltage of the ripple cancellation converter 35, and the combined voltage (Vrcc_ref) is used as the reference voltage for the ripple cancellation converter.

Parallel Ripple Cancellation Converter

The above embodiments provide series-connected ripple cancellation converters, wherein the main output voltage Vo1 and the auxiliary output voltage Vo3 from the ripple cancellation converter are connected in series and added such that the ripple voltage in the main output is cancelled. However, parallel-connected embodiments are also provided herein. In parallel compensation, the auxiliary output of a current ripple cancellation converter 35 is connected in parallel with the main output, as shown in the embodiment of FIG. 13.

Figure 13:
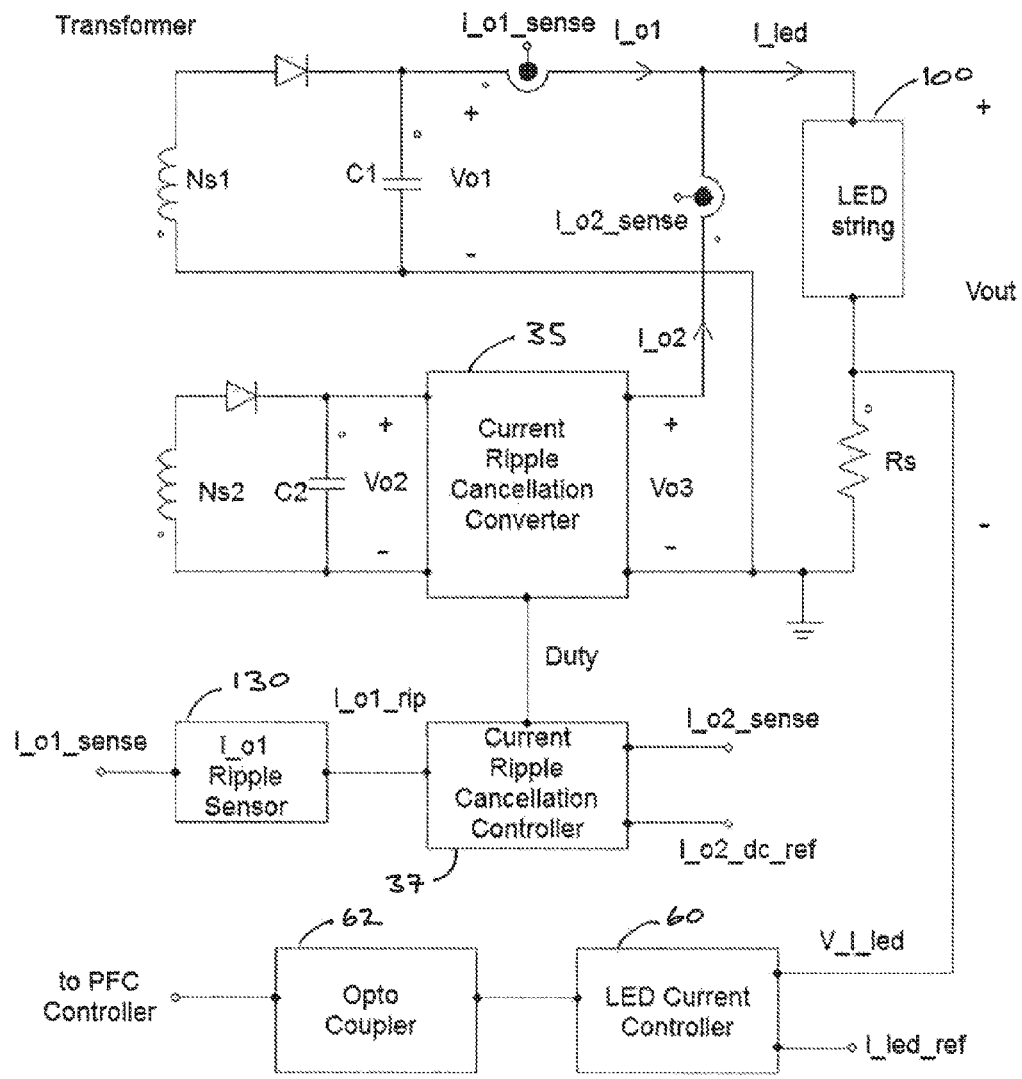
FIG. 13 is a block diagram of driver power supply with a parallel-connected ripple current cancellation controller and load current control, according to one embodiment.

In FIG. 13, the total current for the load 100, which may be an LED as shown, is I_led. The main output Vo1 provides most of the current I_o1 required for the LED. This current contains low frequency ripple (e.g., at either 100 Hz or 120 Hz). The output current of the main output can be described by the following equation:

$$I\_o1 = I\_o1\_dc + I\_o1\_rip \quad (18)$$

wherein I_o1_dc represents the DC value and I_o1_rip indicates the low frequency ripple of the main output current.

The output current I_o1 is sensed and its ripple component I_o1_rip is retrieved by an I_o1 ripple sensor circuit 130.

The output current of the current ripple cancellation converter 35 is controlled such that:

$$\begin{aligned} I\_o2 &= I\_o2\_dc - I\_o1\_rip \\ &= I\_o2\_dc\_ref - I\_o1\_rip \end{aligned} \quad (19)$$

That is, the output current of the current ripple cancellation converter has a DC value determined by a reference (I_o2_dc_ref) and an AC value equal to the inverse of the ripple value of I_o1. Therefore, the current through the LED load will be:

$$\begin{aligned} I\_led &= I\_o1 + I\_o2 \\ &= I\_o1\_dc + I\_o1\_rip + I\_o2\_dc - I\_o1\_rip \\ &= I\_o1\_dc + I\_o2\_dc \end{aligned} \quad (20)$$

From equation (20) it can be seen that there is no ripple component for the LED current.

To improve efficiency, I_o2_dc may be selected to be smaller than I_o1_dc.

The LED current is controlled by an LED current controller 60 and isolating device 62 such as an opto-coupler, and the error signal is sent to the primary side to provide a reference for a power factor correction controller. By adjusting the LED current reference I_led_ref, the output voltage of Vo1 changes and the DC value of the main output current I_o1 (I_o1_dc) also changes, such that the LED current changes.

In other embodiments, other converter types may be used to implement the current ripple cancellation converter. For example, in one embodiment a buck converter is used. In this case, the voltage Vo2 should be higher than Vo3, which is substantially the same as Vo1, as they are connected together in parallel.

In another embodiment, a boost converter is used to implement the current ripple cancellation converter. In this case, Vo2 should be lower than Vo3.

In another embodiment, a buck-boost converter is used to implement the current ripple cancellation converter. In this case, the polarity of the input voltage Vo2 of the current ripple cancellation converter is reversed relative to the polarity of Vo1.

Integrated Circuit Implementation

In some applications, such as an LED driver, the current for the ripple cancellation converter is not large, for example, it may be in the range of 0.5 A to 1 A, depending on the application. The ripple voltage is normally less than 10 V (peak to peak value). For some applications, a preferred way to implement the ripple cancellation converter and the related control circuit may be in an integrated circuit (IC) chip. For example, the IC chip may include the switch (e.g., MOSFET) and control circuits. For example, in one embodiment the high side switch (such as Sb1 in FIG. 10) may be implemented with a P channel MOSFET to conveniently facilitate gate drive. This is described in greater detail below, wherein, for example, a buck converter is used as the ripple cancellation converter. Other converter types may also be used, as would be apparent to one of ordinary skill in the art.

Figure 14:
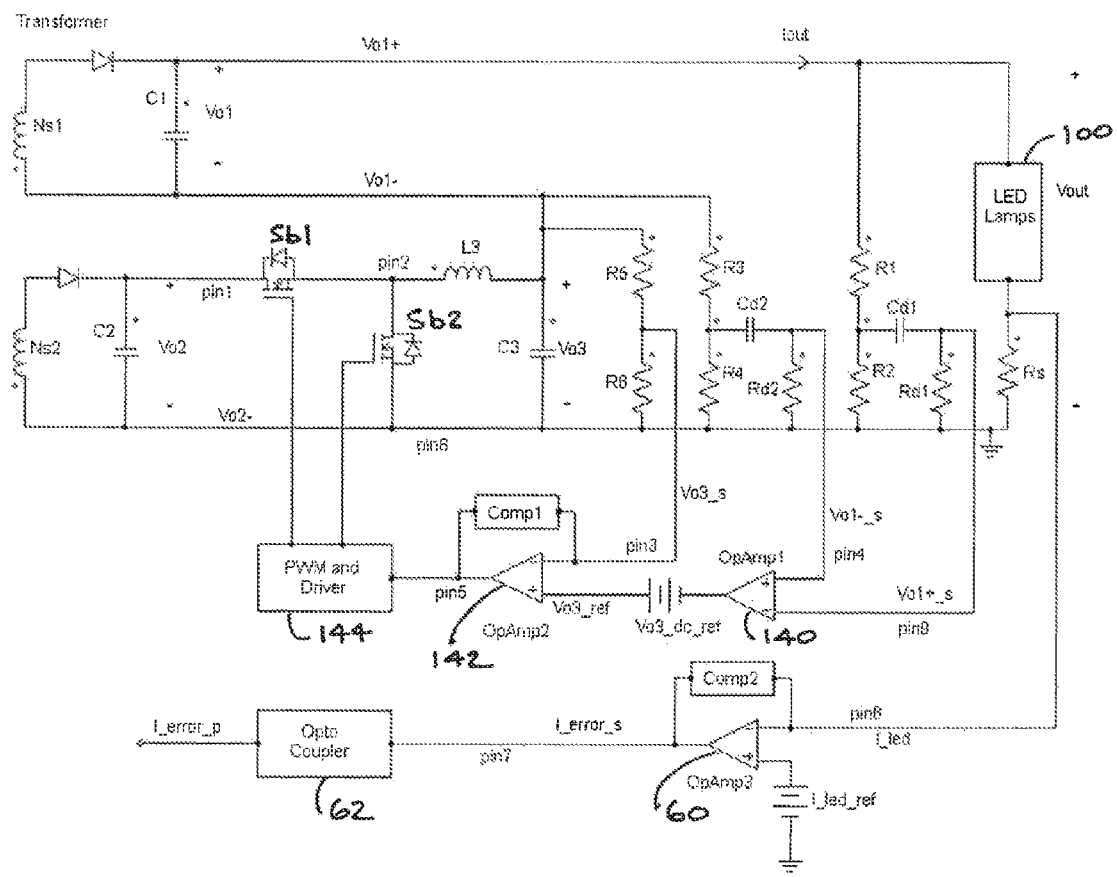
FIG. 14 is a schematic diagram of driver power supply secondary side and control circuitry suitable for integrated circuit implementation, according to one embodiment.

FIG. 14 shows a circuit diagram of a ripple cancellation converter and related control circuits according to one embodiment, wherein the load is an LED. The secondary side ground is at the negative terminal of Vo2. R1 and R2 form a resistor divider from the positive terminal of Vo1 (Vo1+) to ground. Cd1 and Rd1 form a DC blocking circuit that blocks the DC component in Vo1+. Similarly, R3 and R4 is a resistor divider from the negative terminal of Vo1 (Vo1−) to ground. Cd2 and Rd2 is a DC blocking circuit that blocks the DC component of Vo1−. The signals Vo1−_s and Vo1+_s are fed to a circuit 140, in this case OpAmp1 which calculates the difference and reconstructs the ripple voltage of Vo1. The output of OpAmp1 is offset by a voltage with value of Vo3_dc_ref. Therefore, the reference voltage for the buck converter is:

$$Vo3\_ref = Vo3\_dc\_ref - (Vo1+\_s - Vo1-\_s) \quad (21)$$

The value of Vo3_dc_ref is set to be slightly higher than 0.5*(Vo1+_s−Vo1−_s), but not substantially higher, so that the energy provided by the buck converter is minimized.

The output voltage Vo3 is sent to the IC through resistor divider R5 and R6 and compared with Vo3_ref using a voltage error amplifier 142, in this case OpAmp2. Its output is sent to the pulse width modulator (PWM) and driver 144 to control the duty cycle of the buck switches Sb1 and Sb2.

In the design, the ratios R1/R2, R3/R4, and R5/R6 should be substantially the same in order to substantially compensate (i.e., cancel) the low frequency voltage ripple in Vo1.

The LED current is sensed by the resistor Rs and sent to the current error amplifier 60, OpAmp3. The LED current reference signal may be generated inside the IC. The output of the current error amplifier (I_error_s) is sent to the primary side using an opto-coupler (I_error_p) and then used to control the PFC circuit to regulate Vo1.

The pin assignments (pin1, pin2, pin3, . . . , pin9) indicate possible pin out numbers for the integrated circuit. For example, in the embodiment shown, a 9 pin IC chip is needed. In this example Pin8 is the ground or reference point of the integrated circuit chip. It is also the reference point for the secondary side.

Figure 15A:
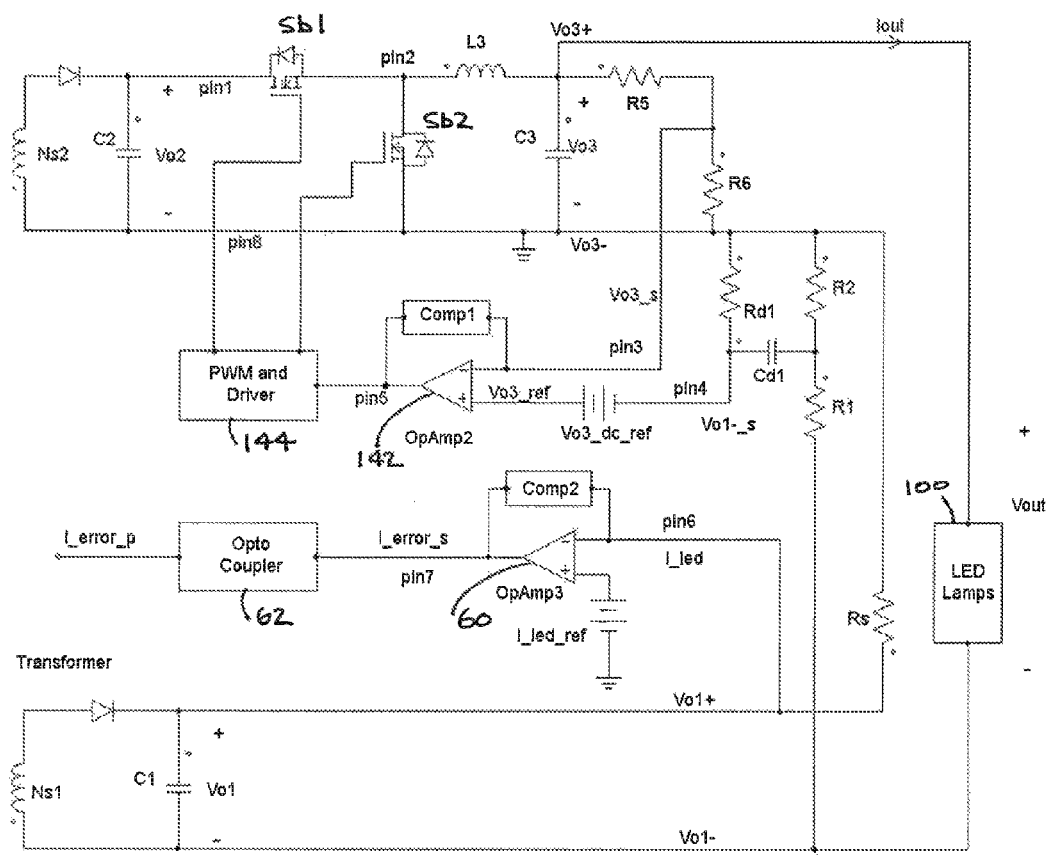
FIG. 15(a) is a schematic diagram of driver power supply secondary side and control circuitry suitable for integrated circuit implementation, according to another embodiment.

In a practical design, it is preferred to have an 8 pin IC chip in order to reduce cost. FIG. 15(a) shows an embodiment where the ripple cancellation converter and control circuits are implemented with an 8 pin IC chip. It is noted that from a power flow point of view, there is no difference between the embodiment shown in FIG. 14 and the embodiment shown in FIG. 15(a).

The main difference between the embodiments in FIG. 14 and FIG. 15(a) is that in FIG. 15(a), Vo3 is connected on top of Vo1 and the secondary side reference point (ground) is moved to the negative terminal of Vo3 (Vo3−). The positive terminal of Vo1 (Vo1+) is connected to the negative terminal of Vo3 (Vo3−) through the current sense resistor Rs. Therefore, Vo1+ is almost zero. The low frequency ripple voltage of Vo1 is obtained by resistor divider R1, R2, Cd1, and Rd1, as indicated by Vo1−_s.

$$Vo1-\_s = -Vo1\_rip * R2/(R1+R2) \quad (22)$$

Vo1−_s is sent to the IC chip through pin 4. In the IC chip, Vo1−_s is added with a voltage Vo3_dc_ref and the combined voltage is used as the reference voltage for Vo3. It is noted that the ratio of R1/R2 and R5/R6 should be substantially the same in order to substantially compensate (i.e., cancel) the low frequency voltage ripple in Vo1. That is, the closer the ratios of R1/R2 and R5/R6, the better will be the compensation.

Figure 15B:
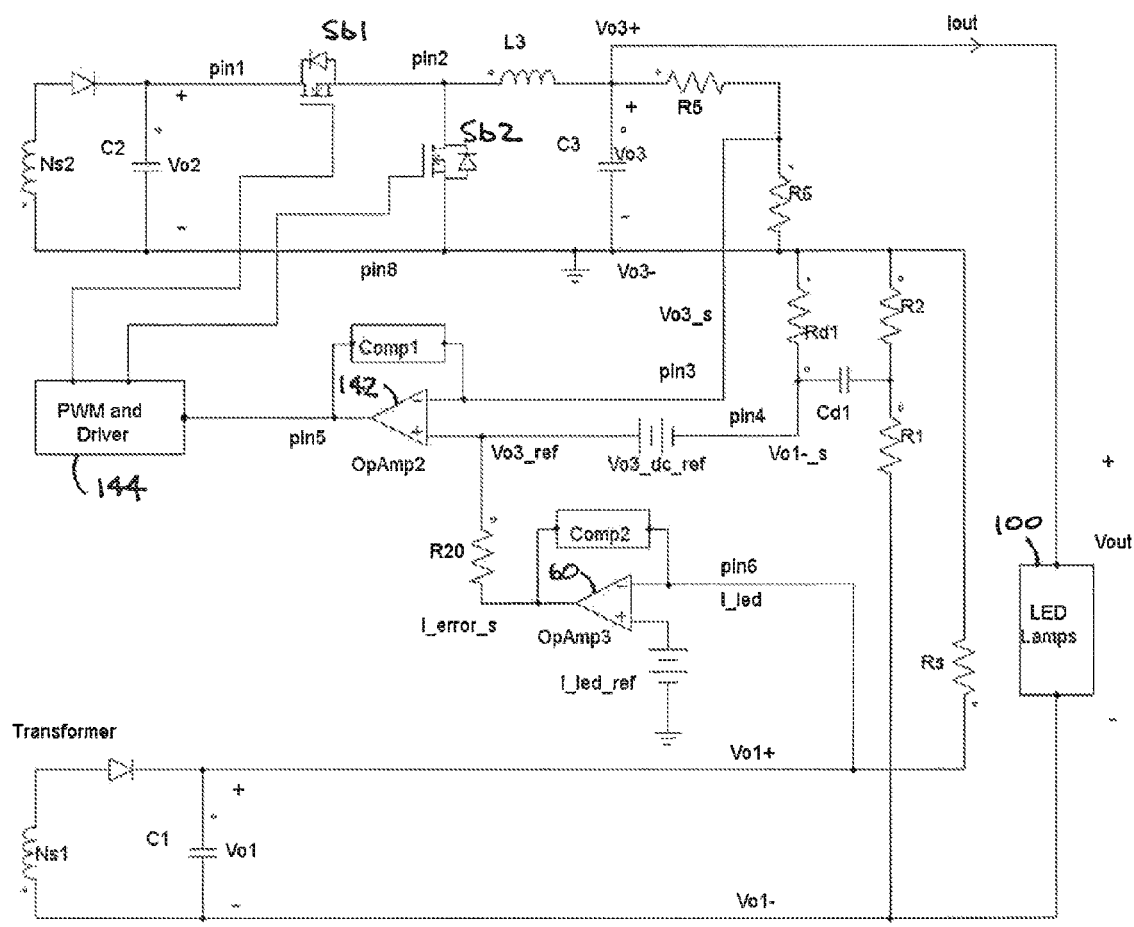
FIG. 15(b) is a schematic diagram of driver power supply secondary side and control circuitry suitable for integrated circuit implementation based on the embodiment of FIG. 14(a), wherein an opto-coupler is not used.

If an opto-coupler is not used, the output of OpAmp3 (as shown in FIG. 15(a)) will be sent to the positive input terminal of OpAmp2 to change the DC reference voltage for Vo3. The embodiment of FIG. 15(b) shows one such implementation. The output of OpAmp3 is connected to Vo3_ref through resistor R20.

Figure 16:
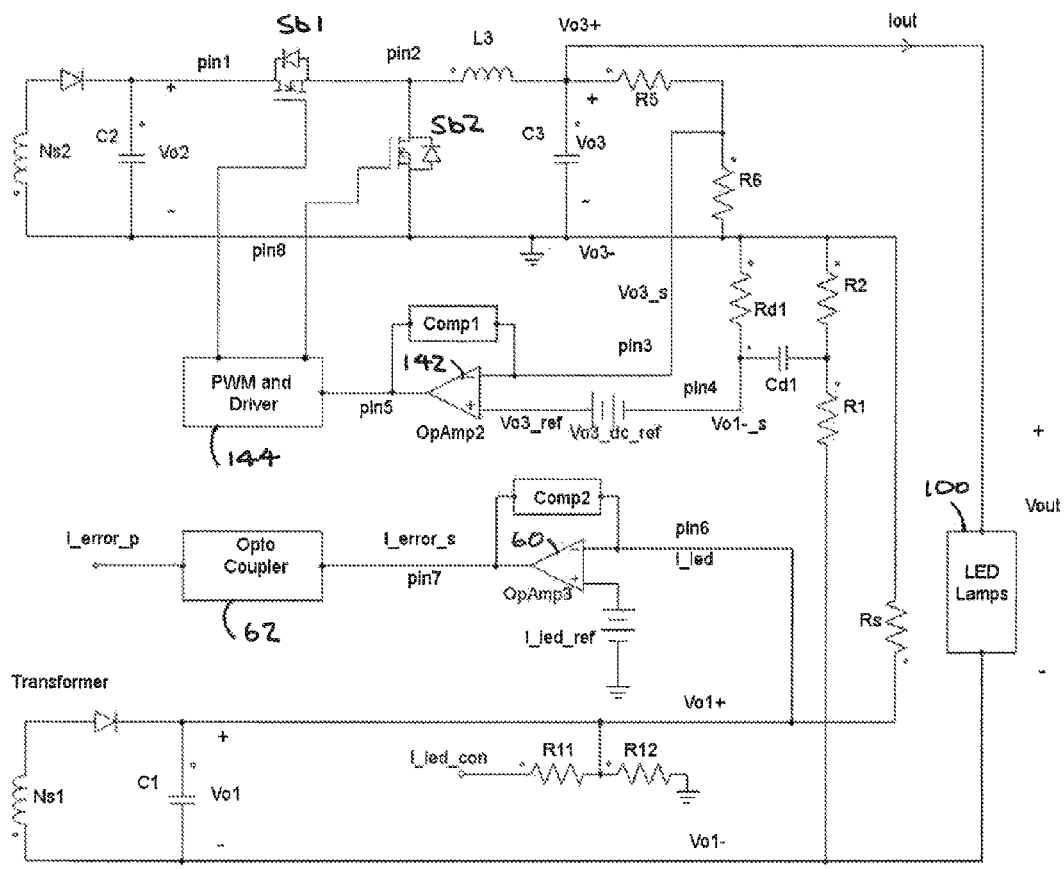
FIG. 16 is a schematic diagram of driver power supply secondary side and control circuitry suitable for integrated circuit implementation, wherein load current control is achieved by applying a voltage to a current amplifier.

In some embodiments, the load current is controlled from the primary side. In this case, the current error signal, I_error_s is sent to the primary side. For example, the error signal 1_error_s may be sent to the primary side using an isolating device 62, such as, for example, an opto-coupler, as shown in FIGS. 14 and 16. In FIGS. 14 and 16, the load 100 is shown as an LED. It is noted that the load current may be adjusted by applying a voltage to the current amplifier as shown in the embodiment of FIG. 16. A voltage (I_led_con) may be applied to signal 1_led (pin6) using resistors R11 and R12. In this way, the voltage applied to the negative terminal of OpAmp3 may be adjusted.

Figure 17:
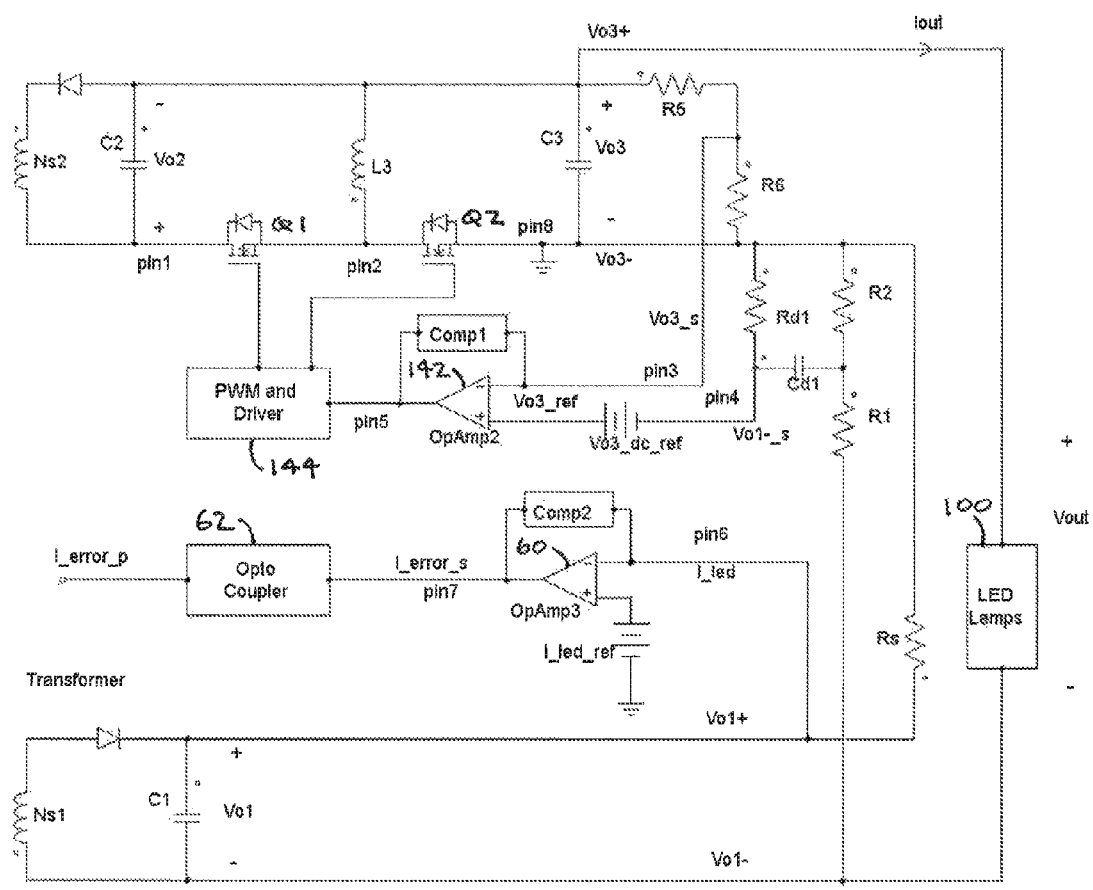
FIG. 17 is a schematic diagram of driver power supply secondary side and control circuitry based on a buck-boost converter, suitable for integrated circuit implementation, according to another embodiment.

The embodiment of FIG. 17 shows an IC implementation with a buck-boost converter used as the ripple cancellation converter. This embodiment may be implemented with an 8 pin IC package. In this case, the Vcc for the IC chip is the sum of Vo2 and Vo3. It is noted that because of relatively larger low frequency ripple across C3, the Vcc of the IC chip will also contain several volts of ripple. A linear regulator may be incorporated inside the IC to compensate for the ripple voltage.

One advantage of using a buck-boost converter is that it permits a wider Vo3 voltage range, as Vo3 may be higher or lower than its input voltage Vo2.

Figure 18:
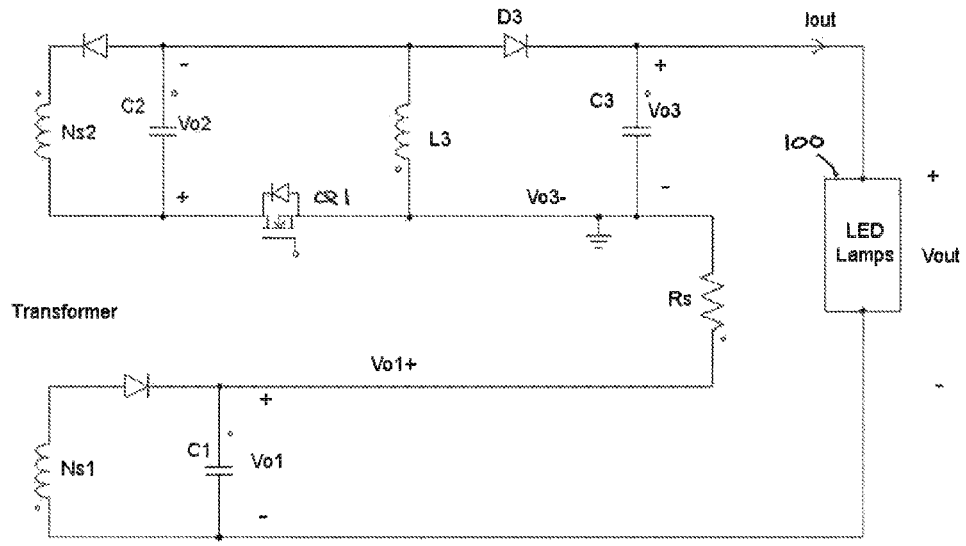
FIG. 18 is a schematic diagram of driver power supply secondary side suitable for implementation using discrete components, according to one embodiment.

The embodiment of FIG. 18 shows another implementation where low cost, off the shelf components (i.e., discrete components) may be used for the ripple cancellation converter, and to achieve low current ripple through the load and high power factor at the AC side. In this embodiment, the diode D3 of the buck-boost converter is moved to the top side. The secondary side ground is the negative terminal of Vo3 and the positive terminal of Vo1 is connected to Vo3 through the load current sense resistor R3. In this case, the gate drive of Q1 is a common ground drive, which simplifies implementation.

Figure 19:
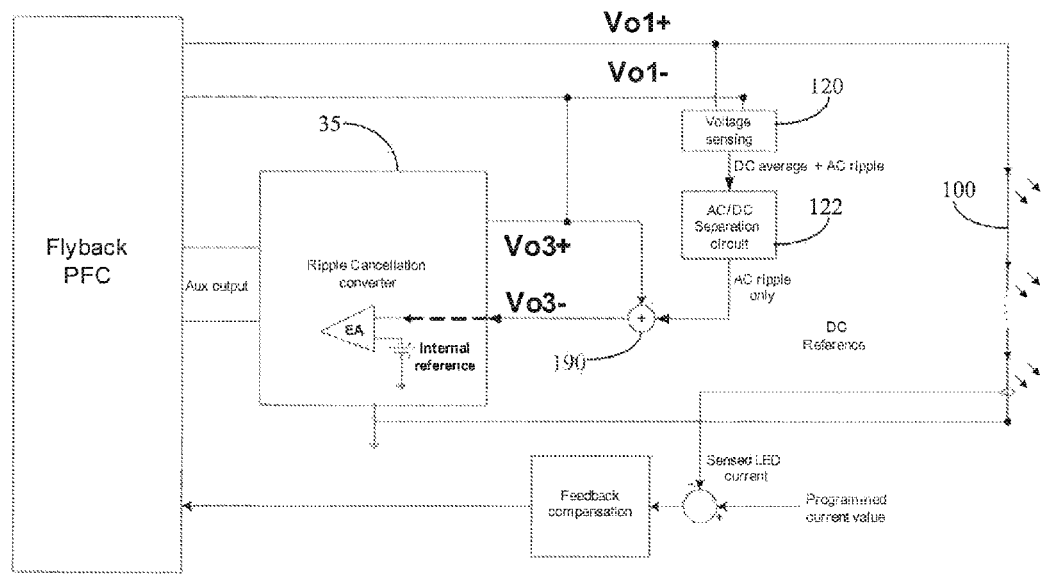
FIG. 19 is a block diagram showing driver power supply secondary side at least partially implemented in an integrated circuit, wherein the DC reference voltage is inside the integrated circuit, according to one embodiment.

In some embodiments wherein an integrated control and power circuit is used, the reference voltage is inside the IC chip and it cannot be changed or controlled. The embodiment of FIG. 19 overcomes this limitation. In FIG. 19, the ripple voltage of the main output (between Vo1+ and Vo1−) is sensed at 120 and separated from the DC voltage at 122, and added at 190 to the output voltage Vo3+ of the ripple cancellation converter 35, and the combined voltage is used as the feedback voltage for the ripple cancellation converter. The output voltage of the ripple cancellation converter includes an AC voltage component that is the same in magnitude and in opposite phase with the AC voltage component (i.e., ripple) of the main output (between Vo1+ and Vo1−). As a result, the voltage across the load 100, in this case an LED, will be a substantially ripple-free DC voltage.

Variable Output Power

In some applications it might be desirable to vary (e.g., control) the output power of the converter. This can be achieved by controlling either the output voltage or current, or by controlling the output power between two different levels according to a variable duty cycle. For example, the two different powers levels might be switched between 0% and 100% of the output power.

For example, in some applications, such as LED lighting, dimming of the LED is required. The term "dimming" means that the light output of the LED is adjustable or variable. Dimming may be achieved by adjusting the average load current. Some applications may require that the LED light is adjustable from 100% to 1%.

One method to achieve dimming is to reduce the regulated load current, as discussed with reference to FIGS. 14, 15, and 16. However, in practical implementation, the current reference voltage change will be too wide. For example, if the current sense resistor value is selected so that at full load, the voltage across the current sense resistor is 0.5 V, the voltage across the current sense resistor will be 5 mV when the required LED current is 1% of the full load. This voltage level will be too low for the current error amplifier 60 (e.g., OpAmp3) to operate properly. One way to avoid this problem is to add a DC offset to the current sense voltage. An example of one way to implement this is shown in the embodiment of FIG. 16. In FIG. 16, a DC offset circuit includes an I_led_con signal and R11 and R12, wherein I_led_con may be an externally generated LED light control signal. With this configuration, the voltage at pin6, I_led, can be calculated approximately as:

$$I\_led = I\_led\_con * R12/(R11+R12) + Iout * Rs \quad (23)$$

The current loop implemented by opamp3 forces the I_led voltage to be the same as the reference voltage I_led_ref. When I_led_on is zero, or very low, $$I\_led = Iout * Rs \quad (24)$$

and the LED current is high. When the voltage level of I_led_con is increased, I_led_con* R12/(R11+R12) will increase, and the Iout*Rs will be reduced. As the sum of these two signals is substantially equal to I_led_ref. Therefore, the LED current Iout will be reduced. With this implementation, the voltage at the input terminal (pin6) of the opamp will be maintained at a value suitable for proper operation, such as, for example, about 0.5 V, based on the above. For example, R11, R12 may be selected such that when I_led_con is 10 V, the voltage across R12 is 0.495V. The voltage across Rs will then be 0.005 V after feedback control. This effectively adjusts the LED current to about 1% of the rated current. When I_led_con is 5 V, the voltage across R12 will be about 0.25 V and the LED current will be about 50% of its rated current.

Figure 20:
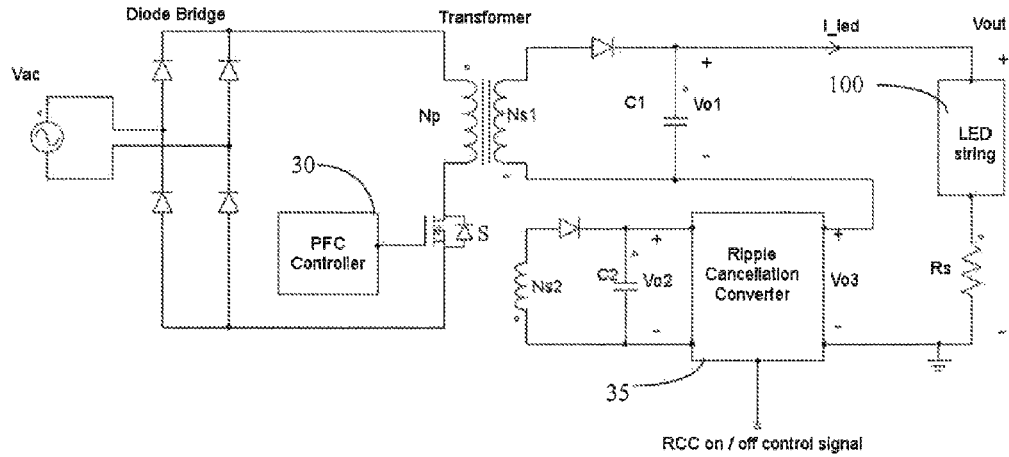
FIG. 20 is a block diagram of an embodiment with variable output power, wherein LED dimming control is provided by using an on/off control signal for the ripple cancellation converter.

Another example of a dimming method is to turn off the ripple cancellation converter for a certain period of time, as shown in the embodiment of FIG. 20. For example, if the ripple cancellation converter 35 is on all the time, the load current will be at its highest value and the LED will be brightest. If the RCC is on for half the time, the load current will be half of the full load current. For preferred performance the on/off frequency of the RCC should be selected to be higher than the line frequency and lower than the converter switching frequency. As an example, the on/off frequency of the RCC may be 500 Hz to 2000 Hz, although other frequencies may be used as required for a given design or application.

Figure 21:
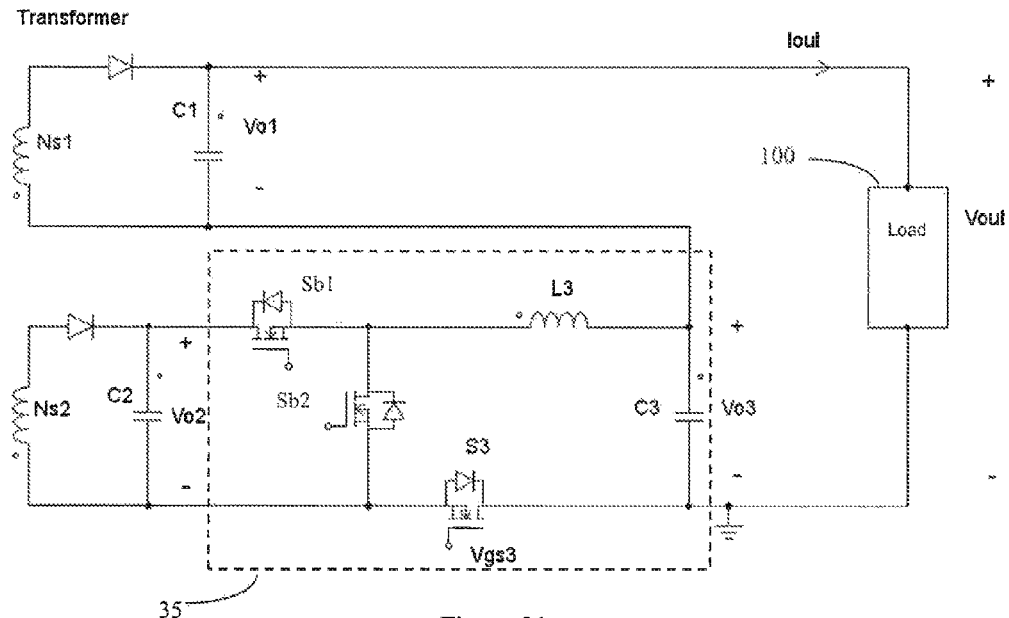
FIG. 21 is a schematic diagram of a power supply with variable output power wherein a buck converter is used for the ripple cancellation converter, according to one embodiment.
Figure 22:
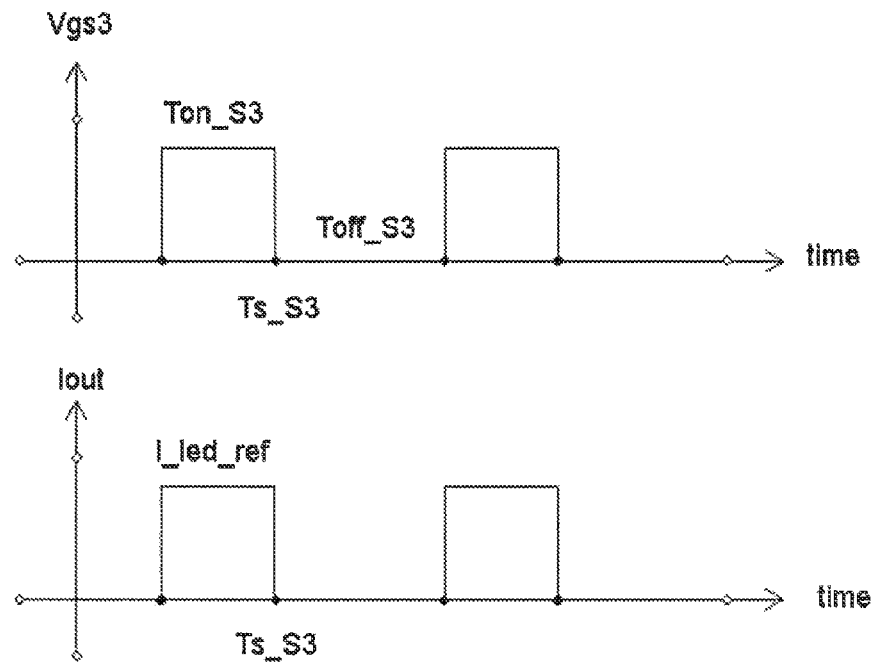
FIG. 22 is a plot showing a control signal (top) and load current (bottom) for the embodiment of FIG. 21.

One way to implement a control strategy for such an embodiment is to add a switch (e.g., MOSFET) to the ripple cancellation converter, as shown in the embodiment of FIG. 21. For example, as compared with the embodiment shown in FIG. 10, a switch S3 is added. During normal operation, i.e., non-dimming operation, S3 is turned on all the time and the circuit operation is substantially the same as before. During dimming operation, a dimming control signal, Vgs3, is applied to the gate of S3, as shown in the example of FIG. 22. The switching period, Ts is $$Ts\_S3 = Ton\_S3 + Toff\_S3 \quad (25)$$

For proper operation the switching frequency of the dimming signal Fs_S3=1/Ts_S3 is selected to be lower than the switching frequency of the buck converter and higher than the line frequency. For example, if the switching frequency of the buck converter is about 100 kHz to 1 MHz, Fs_S3 may be selected to be about 500 Hz to 2000 Hz. In this way, there will be multiple of switching cycles within the Ton_S3 period. During dimming operation, when S3 is on (during the Ton_S3 period), the operation of the converter is substantially the same as before. During the Toff_S3 period, S1, S2, and S3 will all be off. The energy stored in L3 will be transferred to C3 in a very short period of time and substantially no current will flow through the Buck converter. Therefore, the current through the load will also be zero. The waveform of the load current is shown in the example of FIG. 22 (bottom). The average LED current can be calculated as:

$$I\_led\_avg = I\_led\_ref * Ton\_S3/Ts\_S3 \quad (26)$$

Therefore, by adjusting the ratio of Ton_S3/Ts_S3, the average LED current can be adjusted over a wide range, such that dimming is achieved.

Another reason to select the on/off frequency of S3 to be, e.g., several hundred to several thousand Hz is that the human eye cannot detect the light change in this frequency range.

In various embodiments switch S3 may be placed in series with switch Sb2, or in series with inductor L3. These methods may applied to embodiments wherein the ripple cancellation converter is implemented using other topologies, such as, for example, boost or buck-boost converters, to achieve dimming operation.

Embodiments are further described by way of the following non-limiting example.

EXAMPLE

Figure 23:
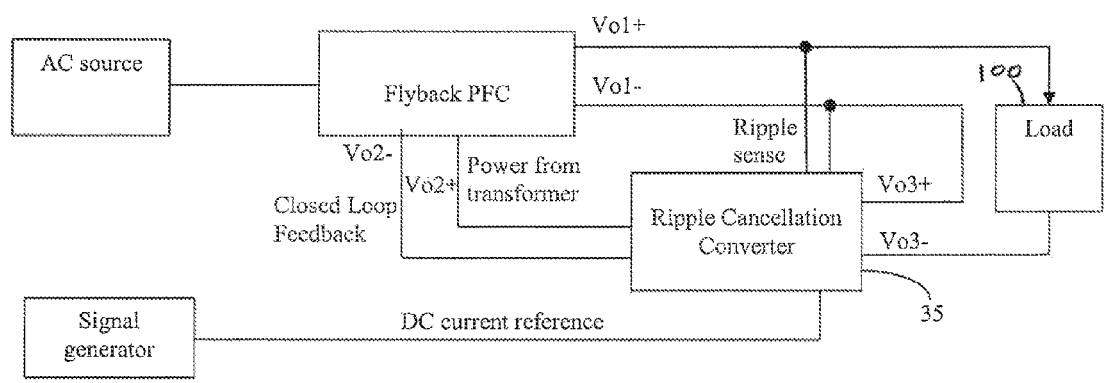
FIG. 23 is a block diagram of a test setup used to evaluate performance of a power supply with a ripple cancellation converter according to one embodiment.

Methods and circuits as described above were applied to a power supply to investigate efficiency and current ripple reduction performance. A block diagram of the test setup is shown in FIG. 23, and Table 1 provides details on the test equipment used. For this example, a Buck converter was used for the ripple cancellation converter, and LEDs were used as the load.

TABLE 1

Measurement Equipment

| | |
|---|---|
| AC power source | Agilent 6813B |
| DC voltage source | Agilent 6654A |
| Multi-meter | Fluke 4 digit multi-meter |
| Load | 22 LEDs, LR W5AM-HZJZ-1-Z (OSRAM Opto Semiconductors) |
| Signal generator | Agilent 33250A |
| Oscilloscope | Tektronix TDS3034B |
| Current probe | Tektronix TCP202 |

Figure 24:
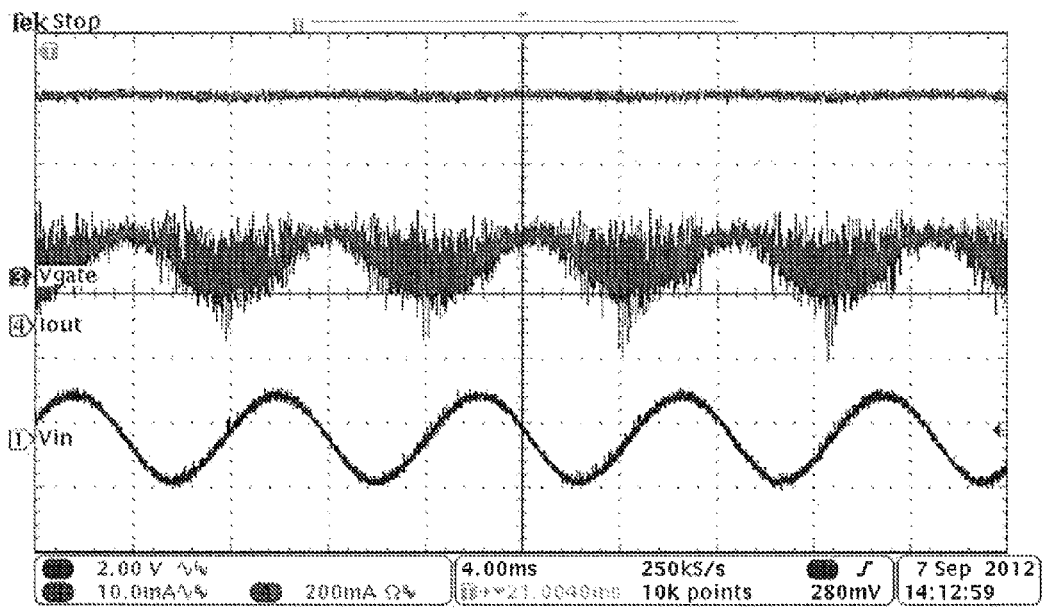
FIG. 24 is a plot showing performance for the test setup of FIG. 23, wherein the upper waveform is the DC coupled load current (200 mA/div), the middle waveform is the AC coupled load current (10 mA/div), and the bottom waveform is the AC ripple voltage at the main output, between Vo1+ and Vo1− (2 V/div)
Figure 25:
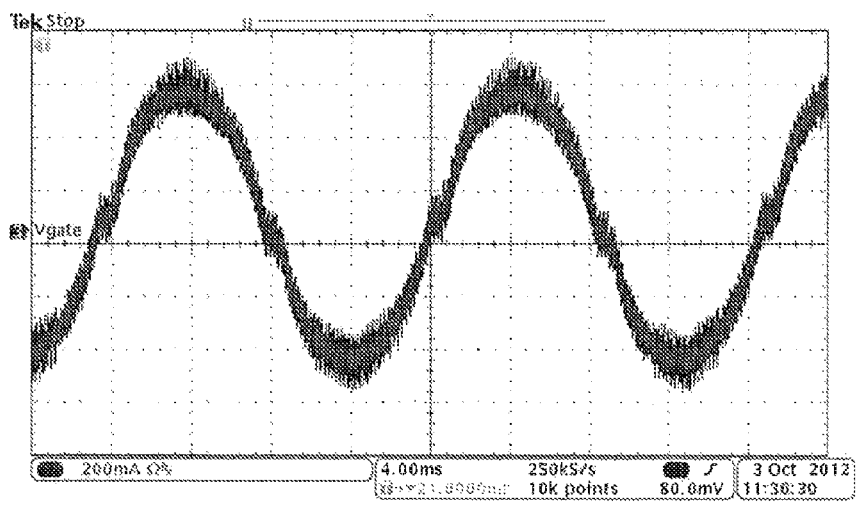
FIG. 25 is a plot of the AC input current waveform at 110 V AC and 50 V, 0.7 A output, for the test setup of FIG. 23.

Addition of the ripple cancellation converter substantially reduced AC ripple in the output current. FIG. 24 shows the measured load current ripple, with 120V AC input and an LED voltage of about 50V DC and LED DC current of about 0.7 A DC. It is noted that the load current ripple is about 10 mA peak to peak, which is very small as compared with the DC current of 0.7 A. The AC ripple at the main output (between Vo+ and Vo− of FIG. 23) was about 3 V peak to peak. FIG. 25 shows the input AC current waveform at the same conditions. It can be seen that the AC current is a sinusoidal waveform, which indicates high power factor is achieved. The power factor was measured to be 0.99.

Equivalents

Those skilled in the art will recognize or be able to ascertain variants of the embodiments described herein. Such variants are within the scope of the invention and are covered by the appended claims.

The invention claimed is:

1. A circuit for use with a power supply that provides a first output including a first DC voltage with a first AC voltage ripple or a first DC current with a first AC current ripple, the circuit comprising:
   a ripple cancellation converter that:
   (i) provides a second AC voltage ripple equal in magnitude and opposite in phase to the first AC voltage ripple, and is connected in series with the first output, such that the first AC voltage ripple is substantially cancelled; or
   (ii) provides a second AC current ripple equal in magnitude and opposite in phase to the first AC current ripple, and is connected in parallel with the first output, such that the first AC current ripple is substantially cancelled; and
   a controller that senses a peak to peak value of the first AC voltage ripple or the first AC current ripple and controls the ripple cancellation converter to minimize a DC offset of the second AC voltage ripple or the second AC current ripple;
   wherein substantially ripple-free DC output power is provided.

2. The circuit of claim 1, wherein the ripple cancellation converter comprises a buck converter, a boost converter, a buck-boost converter, or a full bridge converter.

3. The circuit of claim 1, further comprising a power factor correction circuit.

4. The circuit of claim 3, wherein operation of the power factor correction circuit is based on a feedback signal derived from a load current.

5. The circuit of claim 1, wherein the substantially ripple-free DC output power is variable.

6. The circuit of claim 1, for use with an AC-DC power supply.

7. The circuit of claim 1, wherein the power supply comprises a flyback converter, an isolated boost converter, a buck-boost converter, a buck converter, or a boost converter.

8. The circuit of claim 1, wherein a load comprises an LED.

9. A method for providing substantially ripple-free DC power from a first output power comprising a first DC voltage with a first AC voltage ripple or a first DC current with a first AC current ripple, the method comprising:
   sensing a peak to peak value of the first AC voltage ripple or the first AC current ripple;
   (i) providing a second AC voltage ripple equal in magnitude and opposite in phase to the first AC voltage ripple;
   minimizing a DC offset of the second AC voltage ripple based on a sensed value of the first AC voltage ripple;
   connecting the second AC voltage ripple in series with the first output power, such that the first AC voltage ripple is substantially cancelled; or
   (ii) providing a second AC current ripple equal in magnitude and opposite in phase to the first AC current ripple;
   minimizing a DC offset of the second AC current ripple based on a sensed value of the first AC current ripple;
   connecting the second AC current ripple in parallel with the first output, such that the first AC current ripple is substantially cancelled;
   wherein substantially ripple-free DC output power is provided.

10. The method of claim 9, including using a buck converter, a boost converter, a buck-boost converter, or a fail bridge converter to provide the second AC voltage ripple or to provide the second AC current ripple.

11. The method of claim 9, further comprising adjusting a power factor of a circuit used to provide the first DC power.

12. The method of claim 11, comprising adjusting the power factor based on a feedback signal derived from a load current.

13. The method of claim 9, comprising using an AC-DC power supply to provide the main output power.

14. The method of claim 13, including using a flyback converter, an isolated boost converter, a buck-boost converter, a buck converter, or a boost converter for the ACDC power supply.

15. The method of claim 9, comprising connecting the substantially ripple-free DC output power to a load, wherein the load comprises an LED.

16. The circuit of claim 1, wherein:
   (i) the DC offset of the second AC voltage ripple is equal to
      (a) a peak value of the AC voltage ripple, or (b) (0.5+K) times the peak to peak value of the AC voltage ripple; or
   (ii) the DC offset of the second AC current ripple is equal to
      (a) a peak value of the AC current ripple, or (b) (0.5+K) times the peak to peak value of the AC voltage ripple;
   wherein K is from 0.1 to 1.0.

17. The circuit of claim 1, wherein the ripple cancellation converter comprises a full bridge converter.

18. The circuit of claim 17, wherein:
   (i) the DC offset of the second AC voltage ripple is less than a peak value of the first AC voltage ripple; or (ii) the DC offset of the second AC current ripple is less than a peak value of the first AC current ripple.

19. The method of claim 9, wherein:
(i) the DC offset of the second AC voltage ripple is equal to (a) a peak value of the AC voltage ripple, or (b) (0.5+K) times the peak to peak value of the AC voltage ripple; or
(ii) the DC offset of the second AC current ripple is equal to (a) a peak value of the AC current ripple, or (b) (0.5+K) times the peak to peak value of the AC voltage ripple; wherein K is from 0.1 to 1.0.

20. The method of claim 9, including using a full bridge converter to provide the second AC voltage ripple or to provide the second AC current ripple.

21. The method of claim 20, wherein minimizing comprises:
(i) setting the DC offset of the second AC voltage ripple to be less than a peak value of the first AC voltage ripple; or
(ii) setting the DC offset of the second AC current ripple to be less than a peak value of the first AC current ripple.

* * * * *